(12) United States Patent
Perez et al.

(10) Patent No.: US 11,566,504 B2
(45) Date of Patent: Jan. 31, 2023

(54) APPLICATION OF ELASTIC FLUIDS IN HYDRAULIC FRACTURING IMPLEMENTING A PHYSICS-BASED ANALYTICAL TOOL

(71) Applicant: Weatherford Technology Holdings, LLC, Houston, TX (US)

(72) Inventors: Oswaldo J. Perez, Houston, TX (US); Francisco E. Fragachan, Katy, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 492 days.

(21) Appl. No.: 16/539,645

(22) Filed: Aug. 13, 2019

(65) Prior Publication Data

US 2021/0017844 A1   Jan. 21, 2021

Related U.S. Application Data

(60) Provisional application No. 62/875,293, filed on Jul. 17, 2019.

(51) Int. Cl.
*E21B 43/26* (2006.01)
*E21B 41/00* (2006.01)
(Continued)

(52) U.S. Cl.
CPC .......... *E21B 43/26* (2013.01); *E21B 41/0092* (2013.01); *E21B 43/267* (2013.01); *E21B 49/00* (2013.01); *G01N 11/162* (2013.01)

(58) Field of Classification Search
CPC .... E21B 43/26; E21B 43/267; E21B 41/0092; E21B 49/00; G01N 11/162
See application file for complete search history.

(56) References Cited

U.S. PATENT DOCUMENTS 2,798,053 A   7/1957   Brown
3,058,909 A   10/1962  Kern
(Continued)

FOREIGN PATENT DOCUMENTS

WO   2015-042028 A1   3/2015
WO   2015-125121 A1   8/2015
WO   2016-079625 A1   5/2016

OTHER PUBLICATIONS

International Search Report issued in co-pending PCT Application No. PCT/US2020/038065, dated Sep. 14, 2020, 12 pages.
(Continued)

*Primary Examiner* — Christopher J Sebesta
(74) *Attorney, Agent, or Firm* — Cabello Hall Zinda, PLLC

(57) ABSTRACT

An integrated hydraulic fracture design model that utilizes elastic fluids with high proppant suspension and low required power for injection into a hydrocarbon-bearing, subterranean formation. The integrated physics-based approach utilizes a hybrid friction model to compute viscous and elastic behavior to estimate pressure losses at different pumping conditions coupled with a novel geomechanical model capable of modeling proppant transport with elastic fluids in planar hydraulic fractures and natural fractures. An integrated process to optimize hydraulic fracture design evaluates and quantifies the proppant-carrying capacity of elastic fluids and its impact on the proppant transport process, and low water requirements.

28 Claims, 25 Drawing Sheets

(51) Int. Cl.
  *E21B 43/267* (2006.01)
  *E21B 49/00* (2006.01)
  *G01N 11/16* (2006.01)

(56) References Cited

U.S. PATENT DOCUMENTS

| | | | |
|---|---|---|---|
| 3,163,219 A | 12/1964 | Wyant et al. | |
| 4,821,564 A * | 4/1989 | Pearson | G01N 11/08 |
| | | | 73/152.52 |
| 7,271,133 B2 | 9/2007 | Weaver et al. | |
| 7,708,069 B2 | 5/2010 | Watters et al. | |
| 8,114,818 B2 | 2/2012 | Reddy et al. | |
| 8,501,983 B2 | 8/2013 | Yang et al. | |
| 8,950,493 B2 | 2/2015 | van Petegem et al. | |
| 9,085,975 B2 | 7/2015 | Abad | |
| 9,328,285 B2 | 5/2016 | Ekstrand et al. | |
| 9,410,399 B2 | 8/2016 | Andersen | |
| 2002/0065359 A1 | 5/2002 | Allan et al. | |
| 2006/0283591 A1 | 12/2006 | Willberg | |
| 2008/0093073 A1 | 4/2008 | Bustos et al. | |
| 2010/0224365 A1 * | 9/2010 | Abad | E21B 43/26 |
| | | | 166/275 |
| 2011/0223125 A1 | 9/2011 | Hough et al. | |
| 2011/0272159 A1 | 11/2011 | Osiptsov et al. | |
| 2012/0273206 A1 | 11/2012 | Zamora | |
| 2013/0041587 A1 * | 2/2013 | Gomaa | E21B 43/26 |
| | | | 702/6 |
| 2013/0189198 A1 | 7/2013 | Tamareselvy | |
| 2014/0014348 A1 | 1/2014 | Mahoney et al. | |
| 2014/0178325 A1 | 6/2014 | Martinez-Castro et al. | |
| 2014/0251610 A1 | 9/2014 | Brannon | |
| 2014/0365409 A1 | 12/2014 | Burch et al. | |
| 2015/0252250 A1 | 9/2015 | Levey et al. | |
| 2017/0029692 A1 | 2/2017 | Dugonjic-Bilic et al. | |
| 2017/0370197 A1 * | 12/2017 | Han | E21B 41/0092 |
| 2018/0094514 A1 * | 4/2018 | Leem | E21B 43/26 |
| 2018/0346802 A1 * | 12/2018 | Noles, Jr. | C09K 8/685 |
| 2019/0040305 A1 | 2/2019 | Ruyle et al. | |
| 2019/0119563 A1 | 4/2019 | He et al. | |

OTHER PUBLICATIONS

International Search Report based on copending PCT Application No. PCT/US18/43295 dated Nov. 20, 2018, 12 pages.
Restriction Requirement in U.S. Appl. No. 15/666,327, dated May 14, 2018, 7-pgs.
Office Action in U.S. Appl. No. 15/666,327, dated Oct. 16, 2018, 11-pgs.
Office Action issued in co-pending Russian Application No. 2020108457, dated Sep. 30, 2020, 14 pages.
Office Action in co-pending U.S. Appl. No. 16/628,234 dated Nov. 9, 2020, 14-pages.
Final Office Action in co-pending U.S. Appl. No. 16/628,234 dated Mar. 11, 2021, 14-pages.
Office Action in co-pending U.S. Appl. No. 16/628,234 dated Oct. 13, 2021, 18-pages.
Final Office Action in co-pending U.S. Appl. No. 16/628,234 dated May 20, 2022, 18-pages.

* cited by examiner

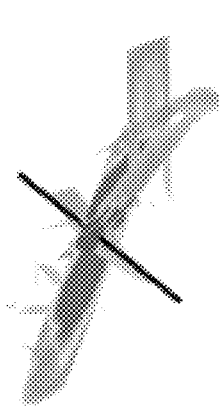
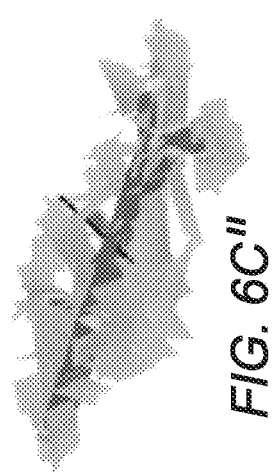
FIG. 6A″   FIG. 6B″   FIG. 6C″
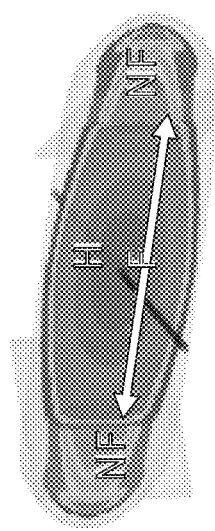
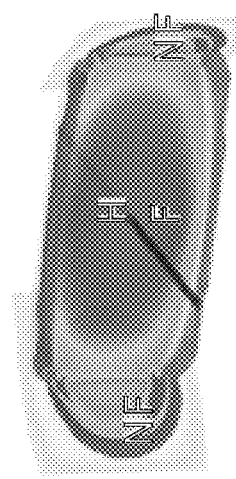
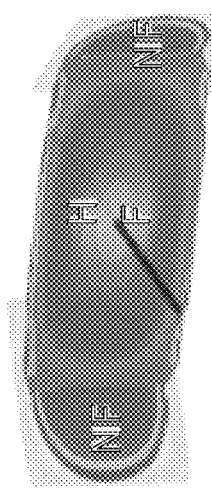
FIG. 6A′   FIG. 6B′   FIG. 6C′
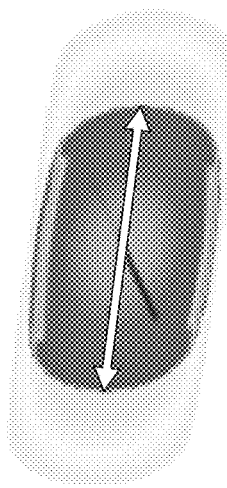
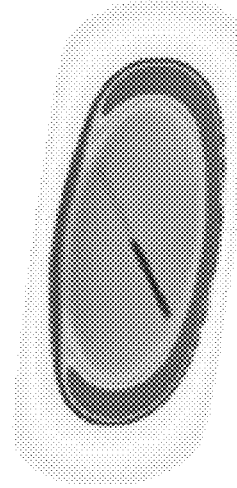
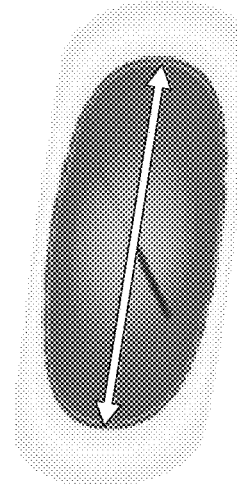
FIG. 6A   FIG. 6B   FIG. 6C

APPLICATION OF ELASTIC FLUIDS IN HYDRAULIC FRACTURING IMPLEMENTING A PHYSICS-BASED ANALYTICAL TOOL

CROSS-REFERENCE TO RELATED APPLICATIONS

This application claims priority to U.S. Prov. Appl. 62/875,293 filed 17 Jul. 2019, which is incorporated herein by reference in its entirety.

BACKGROUND OF THE DISCLOSURE

1. Field of the Disclosure

The present disclosure generally relates to methods, compositions, and techniques for hydraulically fracturing subterranean formations. More particularly, the present disclosure relates to a system for hydraulic fracturing that uses fluids capable of suspending proppant materials with lower pumping power requirements than conventional crosslinked fluids and at the same time reducing fresh water use. The present disclosure relates to an application system for hydraulic fracturing that implements an integrated analytical tool coupled with a geomechanical model to simulate elastic fluids capable of carrying proppant materials without requiring high pumping horsepower.

2. Description of the Related Art

Several fracturing fluids and additives are used in the art for hydraulic fracturing. Fracturing fluids are pumped into the well to create conductive fractures and bypass near-wellbore damage in hydrocarbon-bearing zones. The net result is an expansion in the productive surface-area of the reservoir, compared to the un-fractured formation. A series of chemical additives are selected to impart a predictable set of properties of the fluid, including viscosity, friction, formation-compatibility, and fluid-loss control.

To create the fracture, a fluid is pumped into the wellbore at a high rate to increase the pressure in the wellbore at the perforations to a value greater than the breakdown pressure of the formation. The breakdown pressure is generally believed to be the sum of the in-situ stress and the tensile strength of the rock. Once the formation is broken down and the fracture created, the fracture can be extended at a pressure called the fracture-propagation pressure. The fracture-propagation pressure is equal to the sum of: the in-situ stress, the net pressure drop, and the near-wellbore pressure drop.

The net pressure drop is equal to the pressure drop down the fracture as the result of viscous fluid flow in the fracture, plus any pressure increase caused by tip effects. The near-wellbore pressure drop can be a combination of the pressure drop of the viscous fluid flowing through the perforations and/or the pressure drop resulting from tortuosity between the wellbore and the propagating fracture. Thus, the fracturing-fluid properties are very important in the creation and propagation of the fracture.

The ideal fracturing fluid should: be able to transport the propping agent in the fracture, be compatible with the formation rock and fluids, have low water requirements for effective proppant transport, generate enough pressure drop along the fracture to create a wide fracture, minimize frictional pressure losses during injection, be formulated using chemical additives that are approved by the local environmental regulations, exhibit controlled-break to a low-viscosity fluid for cleanup after the treatment, and be cost-effective.

The viscosity of the fracturing fluid is an important point of differentiation in both the execution and in the expected fracture geometry. Many current practices, generally referred to as "slick water" treatments, use low-viscosity fluids pumped at high rates to generate elongated, well contained or complex fractures with low-concentrations of propping agent (0.2-3 lbm proppant added (PPA) per gallon). In order to minimize risk of early settling, pumping rates must be sufficiently high to transport proppant over long distances (often along horizontal wellbores) before entering the fracture. By comparison, for conventional wide-biwing fractures the carrier fluid must be sufficiently viscous (normally 50 to 1000 cp at nominal shear rates from 40-100 $sec^{-1}$) to transport higher proppant concentrations (1-10 PPA per gallon). These treatments are often pumped at lower pump rates and may create wider fractures (normally 0.1 to 1.0 in.) with excessive height growth and containment.

The density of the carrier-fluid is also important. The fluid density affects the ability of the fluid to flow back after the treatment. Water-based fluids generally have densities near 8.4 ppg. Oil-base fluid densities will be 70 to 80% of the densities of water-based fluids. Foam-fluid densities can be substantially less than those of water-based fluids. In low-pressure reservoirs, low-density fluids, like foam, can be used to assist in the fluid cleanup. Conversely, in certain deep reservoirs (including offshore frac-pack applications), there is a need for higher density fracturing fluids whose densities can span up to >12 ppg.

A fundamental principle used in all fracture models is that "the fracture volume is equal to the total volume of fluid injected minus the volume of fluid that leaks off into the reservoir." The fluid efficiency is the percentage of fluid that is still in the fracture at any point in time, when compared with the total volume injected at the same point in time. The concept of fluid loss has been used to determine fracture area. If too much fluid leaks off, the fluid has a low efficiency (below 40%) and the created fracture volume will be only a small fraction of the total volume injected. However, if the fluid efficiency is too high (above 80%), the fracture will not close rapidly after the treatment and cannot keep the proppant in place. Ideally, a fluid efficiency balance will provide an optimum balance between creating the fracture and having the fracture close down after the treatment to hold proppant in place, however, this will mainly depend on reservoir permeability and associated natural fractures.

In most low-permeability reservoirs, fracture-fluid loss and efficiency are controlled by the formation permeability. In high-permeability formations, a fluid-loss additive is often added to the fracture fluid to reduce leakoff and improve fluid efficiency. In naturally fractured or highly cleated formations, the leakoff can be extremely high, with efficiencies down in the range of 10 to 20%, or less. To fracture naturally fractured formations, the treatment often must be pumped at high injection rates with fluid-loss additives to stimulate a fracture network.

There are several categories of fracturing fluids. For example, the categories of fracturing fluids currently available consist of: viscosified water-based fluids, non-viscosified water-based fluids, gelled oil-based fluids, acid-based fluids, and foam fluids.

Looking at water-based fracturing fluids—uncrosslinked polymers and "slick water", a common practice in the hydraulic fracturing of gas-producing reservoirs is the use of non-viscous "slick water" fluids pumped at high rates (>60 bpm) to generate narrow fractures with low concentrations of proppant. In recent years, these treatments have become a standard technique in fracture stimulation of several U.S. shales, including the Barnett, Marcellus, and Haynesville and yield economically viable production. The low proppant concentration, high fluid-efficiency, and high pump rates in slick water treatments yield highly complex fractures. Additionally, compared to a traditional bi-wing fracture, slick water fractures often find the primary fracture connected to multiple sets of natural fractures, which were formed in different geological environments and present various properties including orientation, frictional resistance, density and size. Coupled with multistage fracture completions and multiple wells collocated on a pad, complex fracture networks yield a high degree of reservoir contact area.

The most critical chemical additive for slick water-fracture execution is the friction reducer (FR). The high pump rates for slick water treatments (often 60-100 bbl/minute) necessitate the action of FR additives to reduce friction pressure up to 70% at least. This effect helps to moderate the pumping pressure to a manageable level during proppant injection. Common chemistries for friction reduction include polyacrylamide derivatives and copolymers added to water at low concentrations. Additional additives for slick water fluids may include biocide, surfactant (wettability, and interfacial tension modification), scale inhibitor, and others. The performance (friction reduction) of slick water fluids are generally less sensitive to mix-water quality, a large advantage over many conventional gelled fracturing fluids. However, in high-salinity mix-water, many FR additives may experience a loss in achievable friction reduction.

There are other advantages and disadvantages of slick water fluids (as compared to that of gelled fracturing fluids). Advantages include: high regained conductivity, due to very minimum or no filtercake present; reduced sensitivity to salinity and contaminants in mix-water; and reduced number of fluid additives required for slick water fracturing fluid. Disadvantages include: larger volumes of water often required for fracture design (compared to "gelled" fracturing fluids); larger horsepower requirement (to maintain high pump rates, 60-110 bpm); limited fracture-width (due to low maximum concentration proppant in low viscosity); reduced %-flowback-water recovery (due to imbibition of fracturing fluid in complex fracture network far from wellbore); and limitation to fine-mesh propping agents (due to reduced ability of nonviscous fluids in transport of large proppants).

As the anticipated proppant-suspension capacity of slick water fluids is quite low, a complementary solution is the use of linear (uncrosslinked) gels. These fluids, based on uncrosslinked solutions of polysaccharides (i.e., guar, derivatized-guar, HEC, xanthan), have viscosities of up to 100 cP at 100 sec$^{-1}$ at surface temperature, which depend on polymer concentration. As this viscosity is several orders of magnitude higher than slick water, linear gels have improved proppant-suspension. When uncrosslinked gels are used in late-slurry stages of a fracturing treatment (where the pad and early-slurry stages used slick water), these are often referred to as "hybrid" fracturing treatments. [Note that "hybrid" may also refer to fracture treatments using crosslinked-gel to follow slick water, crosslinked-gel following linear/un-crosslinked, and other variations]

Polymers are used to viscosify the fluid. Crosslinkers are used to change the viscous fluid to a pseudoplastic fluid. Biocides are used to kill bacteria in the mix water. Buffers are used to control the pH of the fracture fluid. Surfactants are used to lower the surface tension. Fluid-loss additives are used to minimize fluid leakoff into the formation. Stabilizers are used to keep the fluid viscous at high temperature. Breakers are used to break the polymers and crosslink sites at low temperature.

Slick water or slick water fracturing is a method or system of hydro-fracturing that involves adding chemicals to water to increase the fluid flow. It is a fracture method that relies on high volumes of water and minimal chemical additives. Fluid can be pumped down the wellbore as fast as 100 bbl/min. to fracture the shale. Without using slick water, the top pumping rate is around 60 bbl/min. Slick water fracturing methods were used before gels and high viscosity fluids became the industry standard for most fracturing designs, but the simple design of a slick water fracturing has proven to produce a more complex fracture network in certain formations—e.g. the middle Bakken formation.

The process involves injecting friction reducers, usually a polyacrylamide. Biocides, surfactants and scale inhibitors can also be in the fluid. Biocides such as bromine prevent organisms from clogging the fissures and creating slime downhole. Surfactants keep the sand suspended. Methanol and naphthalene can be used for biocides. Hydrochloric acid and ethylene glycol may be utilized as scale inhibitors. Butanol and ethylene glycol monobutyl ether (2-BE) are used in surfactants. Slick water typically uses more water than earlier fracturing methods—between one and five million gallons per fracturing operation.

Other chemical compounds sometimes used include benzene, chromium and a host of others. Many of these are known to be toxic and have raised widespread concern about potential water contamination. This is especially true when the wells undergoing slick water hydro-fracturing are located near aquifers that are being used for local drinking water. Hydro-fracturing activity is heavily regulated by state agencies.

In summary, slick water is a water-based fluid and proppant combination that has low-viscosity. It is typically used in highly-pressurized, deeper shales, while fracturing fluids using nitrogen foam are more common in shallow shales and those that have lower reservoir pressure.

There are primarily three types of fracturing fluids currently used. These are water frac or slick water, linear gel, and crosslinked gel. All three of these frac fluids have different properties and applications.

Water frac is water containing a friction reducer and possibly a biocide, surfactant, breaker or clay control additive. This fluid has a low viscosity of 2-3 cP, which requires a high pump rate to transport proppant. Small proppant size like 40/70 is common with this fluid due to its low viscosity. Water frac is the least damaging to the proppant pack of the three frac fluid types and it is commonly used in gas wells.

Linear gel is water containing a gelling agent like guar, HPG, CMHPG, or xanthan. Other possible additives are buffers, biocide, surfactant, breaker, and clay control. This fluid has a medium viscosity of 10-30 cP, which results in improved proppant transport and wider frac compared to water frac fluid. Medium proppant size like 30/50 is common with this fluid. Linear gel is more damaging to the proppant pack than water frac and it is commonly used in both gas and oil wells.

Cross-linked gel is water containing any of the gelling agents used in linear gel and a crosslinker like boron (B), zirconium (Zr), titanium (Ti) or aluminum (Al). Other possible additives are buffers, biocide, surfactant, breaker, and clay control. This fluid has a high viscosity of 100-2500 cP at 100$^{-1}$ R1:B5 bob configuration, which results in better proppant transport and wider fracs compared to linear gel fracturing fluid. Large proppant sizes like 20/40 and 16/30 are common with this fluid especially at low pump rates such as <60 BPM. Cross-linked gel is more damaging to the proppant pack than linear gel and it is commonly used in oil and high liquid wells because of its common residual of 7-12%.

Other less common fracturing fluids include gelled oil, gelled acid, foamed oil with nitrogen, foamed water with nitrogen or carbon dioxide, and gelled LPG.

Polyacrylamide is a friction reducer used to "slick" the water to minimize friction and lower the power required to pump the fracturing fluid. Petroleum distillates and hydro-treated light petroleum distillate are used as carrier fluids for the polyacrylamide friction reducer. Methanol and ethylene glycol are used as product stabilizers or winterizing agents.

Guar gum and a polysaccharide blend are gelling agents used to thicken the water in order to suspend the sand (proppant). Petroleum distillates and hydro-treated light petroleum distillate are used as carrier fluids for guar gum in liquid gels.

Given today's technology, chemicals must be used in hydraulic fracturing to ensure the producing formation is effectively treated. General hydraulic fracturing chemical usage including the types of chemicals, their uses in the process and the result of their use are discussed below.

Guar gum is a galactomannan—a polysaccharide consisting of a mannose backbone with galactose side groups. It is primarily the ground endosperm of guar beans and is typically produced as a free-flowing, off-white powder. It is known that guar can stiffen water to the extent that a mixture is able to carry sand into horizontal sections of wells and permit fracturing operations therein.

Guar gum shows a clear, low-shear plateau on the flow curve and is strongly shear thinning. The rheology of guar gum is typical for a random coil polymer. It does not show the very high low-shear plateau viscosities seen with more rigid polymer chains such as xanthan gum. It is very thixotropic above 1% concentration, but below 0.3%, the thixotropy is slight. Guar gum shows viscosity synergy with xanthan gum. Guar gum and micellar casein mixtures can be slightly thixotropic if a bi-phase system forms.

Guar gum is economical because it has almost eight times the water-thickening potency of cornstarch and only a small quantity is needed for producing sufficient viscosity. Thus, it can be used in various multiphase formulations: as an emulsifier because it helps to prevent oil droplets from coalescing, and/or as a stabilizer because it helps to prevent solid particles from settling. Guar gum is a viscosifier with very favorable rheological properties. It has a particularly useful ability to form breakable gels when cross-linked with boron. This makes it extremely valuable for hydraulic fracturing.

Fracturing entails the pumping of sand-laden fluids into an oil or natural gas reservoir at high pressure and at a high flow rate. This produces cracks in the reservoir rock and then props the cracks open. Water alone is too "thin" to be effective at carrying proppant sand, so guar gum is one of the ingredients often added to thicken the slurry mixture and improve its ability to carry proppant. There are several properties which are important: 1. Thixotropic: the fluid should be thixotropic, meaning it should gel within a few hours. 2. Gelling and de-gelling: The desired viscosity changes over the course of a few hours. When the fracturing slurry is mixed, it needs to be thin enough to make it easier to pump. Then, as it flows down the pipe, the fluid needs to gel in order to support the proppant and carry it deep into the fractures. After that process, the gel has to break down so that the fracturing fluid can be recovered by flow back but leave the proppant behind. This requires a chemical process which produces then breaks the gel cross-linking at a predictable rate.

Guar+boron+proprietary chemicals can accomplish both of these goals at once.

Manufacturers define different grades and qualities of guar gum by the particle size, the viscosity generated with a given concentration, and the rate at which that viscosity develops. Coarse-mesh guar gums will typically, but not always, develop viscosity more slowly. They may achieve a reasonably high viscosity, but will take longer to achieve. On the other hand, they will disperse better than fine-mesh, all conditions being equal. A finer mesh, such as a 200 mesh, requires more effort to dissolve.

Modified forms of guar gum are available commercially, including enzyme-modified, cationic and hydropropyl guar.

With respect to guar gum and guar derivatives in fracturing, guar gums are preferred as thickeners for Enhanced Oil Recovery (EOR), guar gum and its derivatives account for most of the gelled fracturing fluids. Guar is more water-soluble than other gums, and it is also a better emulsifier, because it has more galactose branch points. Guar gum shows high low-shear viscosity, but it is strongly shear-thinning. Being non-ionic, it is not affected by ionic strength or pH but will degrade at low pH at moderate temperature (pH 3 at 50° C.). Guar's derivatives demonstrate stability in high temperature and pH environments. Guar use allows for achieving exceptionally high viscosities, which improves the ability of the fracturing liquid to transport proppant. Guar hydrates fairly rapidly in cold water to give highly viscous pseudoplastic solutions of, generally, greater low-shear viscosity than other hydrocolloids. The colloidal solids present in guar make fluids more efficient by creating less filter cake. Proppant pack conductivity is maintained by utilizing a fluid that has excellent fluid loss control, such as the colloidal solids present in guar gum.

Guar has up to eight times the thickening power of starch. Derivatization of guar gum leads to subtle changes in properties, such as, decreased hydrogen bonding, increased solubility in water-alcohol mixture, and improved electrolyte compatibility. These changes in properties result in increased use in different fields, like textile printing, explosives, and oil-water fracturing applications.

With respect to crosslinking guar, guar molecules have a tendency to aggregate during the hydraulic fracturing process, mainly due to intermolecular hydrogen bonding. These aggregates are detrimental to oil recovery because they clog the fractures, restricting the flow of oil. Cross-linking guar polymer chains prevents aggregation by forming metal—hydroxyl complexes. The first cross-linked guar gels were developed in the late '60's. Several metal additives have been used for crosslinking, among them are chromium, aluminum, antimony, zirconium, and boron. Boron, in the form of B(OH)3, reacts with the hydroxyl groups on the polymer in a two-step process to link two polymer strands together to form bis-diol complexes.

A one-to-one 1,2 diol complex and a one-to-one 1,3 diol complex place the negatively charged borate ion onto the polymer chain as a pendant group. Boric acid itself does not apparently complex to the polymer so that all bound boron is negatively charged. The primary form of crosslinking may be due to ionic association between the anionic borate complex and adsorbed cations on the second polymer chain. The development of cross-linked gels was a major advance in fracturing fluid technology. Viscosity is enhanced by tying together the low molecular weight strands, effectively yielding higher molecular weight strands and a rigid structure.

Cross-linking agents are added to linear polysaccharide slurries to provide higher proppant transport performance, relative to linear gels.

Lower concentrations of guar gelling agents are needed when linear guar chains are cross-linked. It has been determined that reduced guar concentrations provide better and more complete breaks in a fracture. The breakdown of a cross-linked guar gel after the fracturing process restores formation permeability and allows increased production flow of petroleum products When fracturing, viscosity plays a major role in providing sufficient fracture width to ensure proppant entrance into the fracture and minimize premature screen-out, carrying the proppant from the wellbore to the hydraulic fracture tip and further diverting the proppant into the fracture network, generating a desired net pressure to control hydraulic fracture height growth and natural fracture reactivation, and providing fluid loss control. The fluid used to generate the desired viscosity must be safe to handle, environmentally friendly, non-damaging to the fracture conductivity and to the reservoir permeability, easy to mix, inexpensive and able to control fluid loss. This is a very demanding list of requirements that has been recognized since the beginning of hydraulic fracturing.

The selection of a proper fracturing fluid begins with choosing the pad volume required to create the desired fracture geometry. This is typically followed by choosing how much viscosity the fluid needs to have in order to:

- Provide sufficient fracture width to insure proppant entrance into the fracture and prevent premature screen-out.
- Provide a desired net pressure to either treat some desired hydraulic fracture height growth or prevent breaking out into some undesirable zone for example water and control the extent of reactivated natural fracture network.
- Provide carrying capability to transport proppant from the wellbore to the hydraulic fracture tip and deliver proppant from hydraulic fracture into complex natural fracture network.
- Control fluid loss. In cases where a gel filter cake cannot form, the fracturing fluid viscosity (i.e. Cl) may be the main mechanism for fluid loss control. This choice system continues when it comes to selecting the appropriate fluid system for a propped or acid fracturing treatment. The considerations include:
- Safe—The fluid should expose the on-site personnel to a minimal danger.
- Environmentally Friendly—The composition of the fluid should be as "green" as possible.
- Breaker—The fluid must "break" to a low viscosity so that it can flow back and allow cleanup of the fracture.
- Cost Effective—The fluid must be economical and not drive the treatment cost to an unacceptable level.
- Compatibility—The fluid must not interact and caused damage with the formation mineralogy and/or formation fluids.
- Clean-up—The fluid should not damage the fracture conductivity, cause water blocks, or change the relative permeability of the formation. This becomes very important in low pressure wells or wells that produce very dry gas.
- Easy to Mix—The fluid system must be easy to mix even under very adverse conditions.
- Fluid Loss—The fluid needs to help control fluid loss. An ideal fluid should have fluid loss flexibility.

In summary, an ideal fracturing fluid would be one that has an easily measured controllable viscosity, controllable fluid loss characteristics, would not damage the fracture or react with the formation fluid or rock, and cost less than $4.00 per gallon. Unfortunately, this is currently not possible, so compromises have to be made.

Of these factors the fluid viscosity is the major fluid-related parameter for fracture design and operation. However, how much viscosity is needed is often overestimated. Excessive viscosity increases costs, reduces time-efficiency for injection, raises treating pressure (which may cause undesired height growth and send fluid and proppant into non-productive zones), and can reduce fracture conductivity since many of the chemicals used to increase viscosity leave residue which damages the proppant permeability.

There are several types of fracturing fluids and a wide range of fluid additives. The types of fluids include: water-based fluids, oil-based fluids, energized fluids, multi-phase emulsions, and acid fluids. Additives include: gelling agents, crosslinkers, breakers, fluid loss additives, bactericides, surfactants and Non-emulsifying agents, and clay control additives.

The purpose and downhole result(s) of common additives for fracturing fluids are discussed more fully, below.

The vast majority of fracturing fluids used today use water as the base fluid. Generally, the components that make up cross-linked fracturing fluids include a polymer, buffer, gel stabilizer or breaker and a crosslinker. Each of these components is critical to the development of the desired fracturing fluid properties. The role of polymers in fracturing fluids is to provide fracture width, to suspend proppants, to help provide fracture width, to help control fluid loss to the formation, and to reduce friction pressure in the tubular goods. Guar gum and cellulosic derivatives are the most common types of polymers used in fracturing fluids. The first patent on guar cross-linked by borate was issued on Oct. 16, 1962 (U.S. Pat. No. 3,058,909). Metal-based crosslinking agents developed by DuPont for plastic explosive applications were found to be useful for manufacturing fracturing fluids for high temperature applications. Cellulosic derivatives are residue-free and thus help minimize fracturing fluid damage to the formation and are widely used in Frac and Pack applications. The cellulosic derivatives are difficult to disperse because of their rapid rate of hydration. Guar gum and its derivatives are easily dispersed but produce some residue when broken.

The Base Carrier Fluid (water) creates the fracture geometry and suspends the proppant. Downhole, some of the Base Carrier Fluid stays in the formation while the remainder returns with natural formation water as "produced water" (actual amounts returned vary from well to well).

A "breaker" is an additive that allows a delayed break down of gels when required. Downhole, the breaker reacts with the "crosslinker" and "gel" once in the formation making it easier for the fluid to flow to the borehole. The reaction produces ammonia and sulfate salts which are returned in produced water.

Temporary or permanent clay stabilizers lock down clays in the shale structure. Downhole, they react with clays in the formation through a sodium-potassium ion exchange. This reaction produces sodium chloride which is returned in produced water. Clay stabilizers replace binder salts like calcium chloride, helping to keep the formation intact as the calcium chloride dissolves.

A crosslinker additive maintains the viscosity of the fracturing fluid as temperature increases. Downhole, it combines with the "breaker" in the formation to create salts that are returned in produced water A friction reducer is an additive that reduces friction effects (over base water) in pipes. Downhole, it remains in the formation where temperature and exposure to the "breaker" allows it to be broken down and consumed by naturally occurring micro-organisms. A small amount returns with produced water.

A gel additive may be used to thicken the water in order to suspend the proppant. Downhole, it combines with the "breaker" in the formation thus making it much easier for the fluid to flow to the borehole and return in produced water.

Iron control additives are iron-chelating agents that help prevent precipitation of metal oxides. Downhole, they react with minerals in the formation to create simple salts, carbon dioxide and water all of which are returned in produced water.

A non-emulsifier may be added to break or separate oil/water mixtures (emulsions). Downhole, a non-emulsifier is generally returned with produced water, but in some formations it may enter the gas stream and return in the produced natural gas.

A pH adjusting agent/buffer may be added to maintain the effectiveness of other additives such as cross-linkers. Downhole, it reacts with acidic agents in the treatment fluid to maintain a neutral (neither acidic nor alkaline) pH. Reaction products are mineral salts, water and carbon dioxide which are returned in produced water.

The propping agent (or "proppant") is added to keep fractures open allowing for hydrocarbon production. Downhole, it preferably stays in the formation, embedded in fractures (used to "prop" fractures open).

A scale inhibitor may be added to prevent scale in the pipe and the formation. Downhole, the product attaches to the formation. The majority of product returns with produced water while the remaining portion reacts with microorganisms that break down and consume the product.

A surfactant may be added to reduce the surface tension of the treatment fluid in the formation and thereby improve fluid recovery from the well after the fracturing operation is completed. Downhole, some surfactants are designed to react with the formation, some are designed to be returned with produced water or, in some formations, they may enter the gas stream and return in the produced natural gas.

Ammonium persulfate is often added to the fracturing fluids to break the polymer as it reaches temperature. The first patent (U.S. Pat. No. 3,163,219) on borate gel breakers was issued on Dec. 29, 1964.

Buffers are used in conjunction with polymers so that the optimal pH for polymer hydration can be attained. When the optimal pH is reached, the maximal viscosity yield from the polymer is obtained. The most common example of fracturing fluid buffers is a weak-acid/weak-base blend, whose ratios can be adjusted so that the desired pH is reached. Some of these buffers dissolve slowly allowing the cross-linking reaction to be delayed.

Gel stabilizers are added to polymer solutions to inhibit chemical degradation. Examples of gel stabilizers used in fracturing fluids include methanol, tri-ethanol amine (TEA) and various inorganic sulfur compounds. Other stabilizers are useful in inhibiting the chemical degradation process, but many interfere with the mechanism of crosslinking. The TEA and sulfur-containing stabilizers possess an advantage over methanol, which is flammable, toxic, and expensive and may cause poisoning of reactor tower catalysts.

Water Frac is composed of water, a clay control agent and a friction reducer. Sometimes a water recovery agent (WRA) is added to reduce any relative permeability or water block effects. The advantages of using a "Water Frac" are the low cost, ease of mixing and the ability to recover and reuse the water. The main disadvantage is the low viscosity which results in a narrow fracture width. Because the viscosity is low, the main proppant transport mechanism is velocity so water fracs are typically pumped at very high rates (60 to 120 bpm). Fluid loss is controlled by the viscosity of the filtrate which is close to that of water—i.e. 1.

Linear Gel is composed of water, a clay control agent and a gelling agent such as Guar, HPG or HEC. Because these gelling agents are susceptible to bacteria growth a bactericide is also added. Chemical breakers are also added to reduce damage to the proppant pack. WRA's are also sometimes used. The main advantage of a liner gel is its low cost and improved viscosity characteristics. Fluid loss is controlled by a filter cake which builds on the fracture face as the fluid loses fluid to the formation. The main disadvantage is, as with water fracs, the low viscosity which results in a narrow fracture width. The main disadvantage as compared to a water frac is that, because the returned water has residual breaker, the water is not reusable.

Crosslinked Gels are composed of the same materials as a linear gel with the addition of a crosslinker which increases the viscosity of the linear gel from less than 50 cps into the 100's or 1000's of cps range. The higher viscosity increases the fracture width so it can accept higher concentrations of proppant, reduces the fluid loss to improve fluid efficiency, improves proppant transport and reduces the friction pressure. This crosslinking also increases the elasticity and proppant transport capability of the fluid. Fluid loss is controlled by a filter cake which builds on the fracture face as the fluid loses fluid to the formation. A full description of the types of crosslinkers used, the chemistry and the mechanism of crosslinking is provided in the companion paper on fracturing fluid components.

Oil Based Fluids are used on water-sensitive formations that may experience significant damage from contact with water-based fluids. The first fracturing fluid used to fracture a well employed gasoline as the base fluid, palm oil as the gelling agent and naphthenic acid as the crosslinker—i.e. napalm. Although some crude oils have particulates which could build a filter cake, fluid loss is generally considered to be "Viscosity-Controlled—i.e. C-II". There are some disadvantages in using gelled oils. Gelling problems can occur when using high viscosity crude oils or crude oils which contain high levels of naturally occurring surfactants. When using refined oils such as diesel, the cost is very high and the oil must be collected at the refinery before any additives such as pour point depressants, engine cleaning surfactants, etc. are added. Also, there are greater concerns regarding personnel safety and environmental impact, as compared to most water-based fluids.

Foam/Poly Emulsions are fluids that are composed of a material that is not miscible with water. This could be nitrogen, carbon dioxide or a hydrocarbon such as propane, diesel or condensate. These fluids are very clean, have very good fluid loss control, provide excellent proppant transport and break easily simply via gravity separation. Poly Emulsions are formed by emulsifying a hydrocarbon such as condensate or diesel with water such that the hydrocarbon is the external phase. The viscosity is controlled by varying the hydrocarbon/water ratio. Foams made with nitrogen or carbon dioxide are generally 65 to 80% (termed 65 to 80 quality) gas in a water carrying media which contains a surfactant based foaming agent. Sometimes $N_2$ or $CO_2$ are added at a lower concentration (20 to 30 quality) to form "Energized Fluids". This is done to reduce the amount of water placed on the formation and to provide additional energy to aid in load recover during the post-frac flow back period. Nitrogen can dissipate into the reservoir quite quickly, so fluids energized with $N_2$ should be flowed back as soon as the fracture is closed. $CO_2$, under most conditions, is in a dense phase at static, downhole conditions (prior to the well being placed in production), so is less susceptible to dissipation. $CO_2$ will dissolve in crude oil and thus may act to reduce the crude viscosity which, again, improves clean-up and rapid recovery. When $N_2/CO_2$ are added in qualities greater than 80, the resulting mixture is termed a mist with a "0" viscosity. This quality is normally not used in fracturing. The main disadvantage of these fluids is safety i.e. pumping a gas at high pressure or in the case of poly-emulsions and gelled propane, pumping a flammable fluid. $CO_2$ creates an additional hazard in that it can cause dry ice plugs as pressure is reduced. These fluids are generally also more expensive and the gases may not be available in remote areas.

Characterization of Fracturing Fluids

Fluid viscosity for treatment design is determined from laboratory tests and is reported in service company literature. The ideal experiment for describing fluid flow in a fracture would be to shear a fluid between two plates which are moving parallel and relative to one another. Such an ideal test is not feasible for day-to-day applications so a rotating "cup and bob" viscometer know as a "Couette" viscometer is used. API standard RP39 and ISO 13503-1 fully describe the current testing procedures used by the industry. The viscometer uses a rotating cup and a stationary bob with a gap between the two that simulates the fracture.

The tests described above measure the shear stress generated by specific increasing shear rates (called a ramp), and this data is converted to a "viscosity" value by using a rheological model to describe fluid behavior.

Another factor affecting viscosity is the addition of proppant to the fracturing fluid to from slurry. For a Newtonian fluid, the increase in viscosity due to proppant can be calculated from an equation originally developed by Albert Einstein. For example, it can be shown that an 8-ppg slurry has an effective viscosity about 3 times that for the fracturing fluid alone. This increased viscosity will increase net treating pressure and may significantly impact treatment design. This increase in slurry viscosity also retards proppant fall.

The rate of fall for proppant is normally calculated using Stokes' Law. Stokes' Law is generally not valid for Reynolds numbers much in excess of unity or for hindered settling due to proppant clustering in static fluids. For cross-linked fluids the actual fall rate may be much less than Stokes' Law. Lab data shows that proppant in cross-linked fluids falls at a rate which is reduced by about 80% when compared to non-cross-linked linear gels with the same apparent viscosity. The rate of proppant fall in foams and emulsions is also much less than would be indicated by using the apparent viscosity in Stokes' Law. Another factor affecting proppant fall is the particle concentration which increases slurry viscosity. This retards or hinders the proppant fall because of clustered settling in static fluids. Finally, the slurry flowing through a fracture is generally very low that the shear rate of 40 $sec^{-1}$ used to better match the fluid apparent viscosity.

Various factors can significantly affect the viscosity. Treating pressure is fairly insensitive to viscosity in as much as the pressure is proportional to viscosity raised to the ¼ power. However, the viscosity estimate can easily be off by an order of magnitude, which can have a drastic impact on treatment behavior. An order of magnitude would be ($10^{1/4}$=1.8) so the treating pressure would be 80% greater than anticipated. This could cause undesired height growth and result in treatment failure. For fracturing jobs where the control of net pressure to prevent height growth is important, fluid viscosity is a critical parameter.

Conventional low viscosity fracturing fluids, such as linear gels, slick-water, and HVFR's require a great amount of fresh water to transport proppant at low concentrations into natural fractures due to the fact that their proppant carrying capacity is limited.

In the past, high-viscosity fluids have been the preferred solution for increased proppant transport and reduced proppant settling for hydraulic fracturing operations. This methodology has been effective using systems such as a borate-crosslinked fluid. The downside of this method is an increase in conductivity damage, typically resulting in an 86% percent regain conductivity. While this may be acceptable for some implementations, the major limitation of these systems is the additional loss of needed fracture length.

Often, with low viscosity fluids such as linear gels and friction reducers, a fracture length may be established that allow breaks into secondary fractures. Additionally, mechanical reactivation of the pre-existing natural fracture network may be enhanced. However, these fluids do not offer efficient suspension characteristics of proppant within the fracture under static conditions, which may lead to early settling of the proppant. In addition, this loss of suspension ability may also cause banks of sand to form along the fracture length, which introduces additional pressure losses, and consequently reduces the proppant transport efficiency, and increases pump horse power requirements.

A more recent industry option is the use of a high-viscosity friction reducer in the fracturing fluid. As compared to guar-based systems, the viscosity of such fluids is far lower. However, proppant transport in such systems is not comparable to conventional fracturing fluid systems. When attempting to replicate the suspension properties of alternative fluid systems having a friction reducer by using conventional fracture models, it is challenging to simulate the synergistic effect between shear rate and proppant suspension performance.

Conventional fracturing fluids (i.e. Linear Gels, HVFR's, X-link) follow a Rheology model called "Power Law" that determines the fluid's physics behavior in terms of viscosity and shear rate. Existing hydraulic fracturing tools use the Power Law model by default to model the fracturing fluids. However, elastic fluids cannot be modeled by the simple Power Law, as the fluids' behavior deviates at different shear rate magnitudes.

Elastic fluids with enhanced proppant suspension are capable of transporting more proppant material with lower water requirements.

What is needed is an integrated hydraulic fracturing model capable of capturing the physics of elastic fluids. These complex fluids do not follow a single rheology model, such as power law for most fracturing fluids. In this case a hybrid rheology model needs to be coupled with advanced fracture simulation with an improved proppant transport model, and novel geomechanics approach to capture the real physics of flow of elastic complex fluids. The teachings of the present disclosure solves this problem.

SUMMARY OF THE DISCLOSURE

Disclosed herein below is a method of hydraulic fracturing and natural fracture reactivation optimization using a novel geomechanical model coupled with a complex fluid model. The present disclosure comprises a complete system and application that may encompass any type of elastic fluid behavior ranging from natural polymers to synthetics.

According to the present disclosure, elastic fluid agents, such as copolymers polymerized from acrylic acid monomers, used for hydraulic fracturing operations are characterized by a hybrid rheology behavior that deviates from the typical Power Law model. Using the hybrid rheology behavior, an integrated physics-based engineering analytical and numerical tool models the behavior of such an elastic fluid. In exemplary embodiments, a subject elastic fluid may be configured to carry proppant ranging from silica white, resin coated, curable, and ceramic proppants at concentrations ranging from 0.1 lb/gl-10 lbs/gl. The subject elastic fluids can encompass a viscosity of 20 cP-90 cP at ambient temperature at 511 1/s with R1:B1 bob configuration and equivalent viscosity with R1:B5 and R1:B2 configurations.

The integrated tool is capable of handling the complex hybrid rheology for such elastic fluid. In the end, the integrated tool may be used to reproduce the behavior of a fracturing fluid that has the pumpability of a linear gel fluid and the proppant-carrying ability of a cross-linked polymer.

To model a more complete physics behavior of a subject elastic fluid, such as fluid disclosed herein, elastic properties and friction experiments of the subject fluid are combined in the present teachings. Required parameters are based on both experimental tests and analytical tools. A corrected friction behavior of the subject fluid is then used to calibrate the hydraulic fracture models. Once the model is calibrated, the model can simulate more realistic fracture geometries.

To do this analysis, calibration, and modeling, new physics and fluid technology according to the teachings of the present disclosure are developed based on a subject elastic fluid having a polymer engineered to form a network of packed structures from polymer associations providing the maximum proppant suspension. The new physics and fluid technology break from the traditional reliance on viscosity to enhance proppant transport during treatments. In the end, the new analytical model and fluid technology can enhance fracture conductivity, can improve proppant placement, and can achieve distribution without settling, providing better connectivity with the reservoir and its complexities. In addition, the integrated approach can lead to a major reduction in maintenance costs associated with existing injection pressures, as the current trend is unsustainable.

In particular, the new analytical approach includes a hybrid rheology analytical model that correlate elastic fluids rheology parameters—firstly n' and k' values, and secondly the storage and loss moduli profile (G' and G" accordingly). The complex fluid behavior deviates from common rheology models, as evidenced by the elastic properties, such as storage modulus (G'), loss modulus (G"), and angular frequency (rad-sec), in the context of the unique fluid characteristics of a network of packed structures from polymer associations. Physics-based model results from a 3D fracture simulator computes the viscosity and elastic parameters based on shear rate to calculate the pressure losses along the flow path from surface lines, tubular goods, perforations, and fracture, optimizing horse power requirements based on reduced pressure loses.

BRIEF DESCRIPTION OF THE SEVERAL VIEWS OF THE DRAWING(S)

FIG. 6A is the graphical output of a computer simulation of a fracturing operation using a conventional high-viscosity fracturing fluid.

FIG. 6B is the graphical output of a computer simulation of a fracturing operation using a conventional low-viscosity fracturing fluid.

FIG. 6C is the graphical output of a computer simulation of a fracturing operation using a fracturing fluid according to an embodiment of the present disclosure.

Figure 9A:
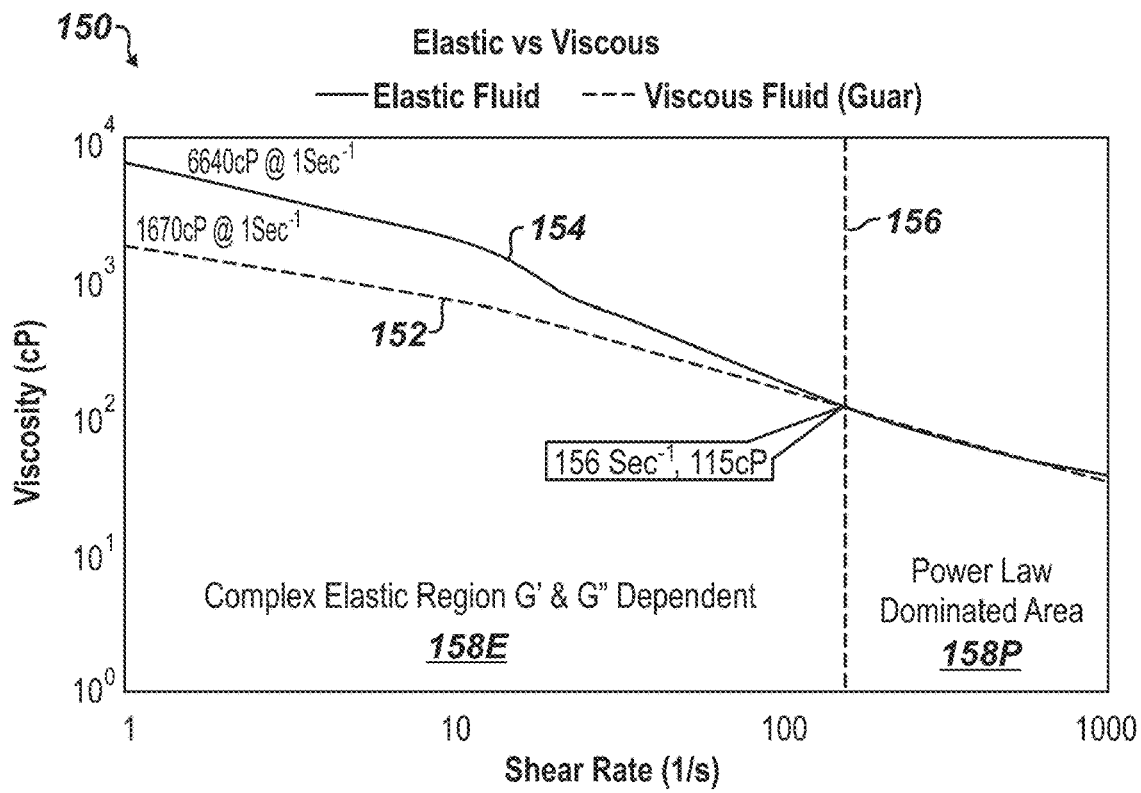

FIG. 9A graphs a rheology test performed on an elastic fluid and a viscous fluid at shear rates from 0.01 (1/sec) to 1000 (1/sec).

Figure 9B:
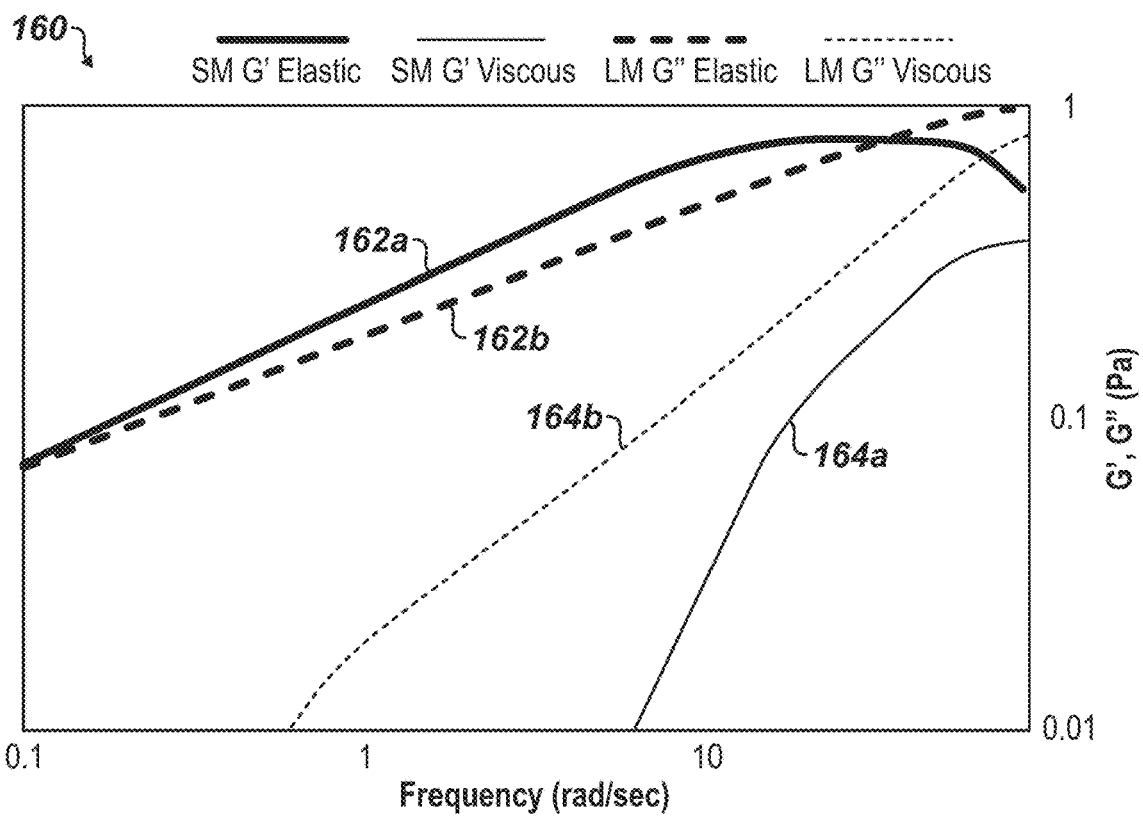

FIG. 9B shows an oscillation test, based on angular frequency, to extract storage modulus G', and loss modulus G" for elastic fluid and viscous fluid.

Figure 10:
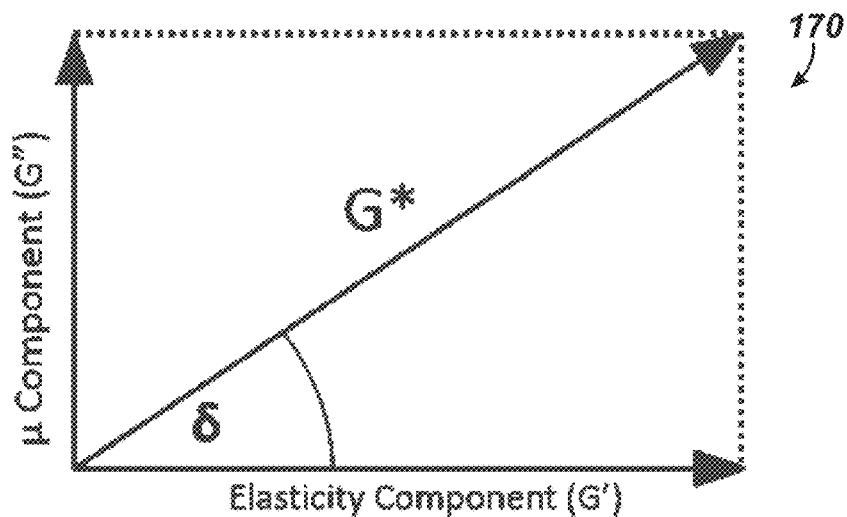

FIG. 10 is a representation of the elasticity law defined by the complex shear modulus G*.

Figure 11:
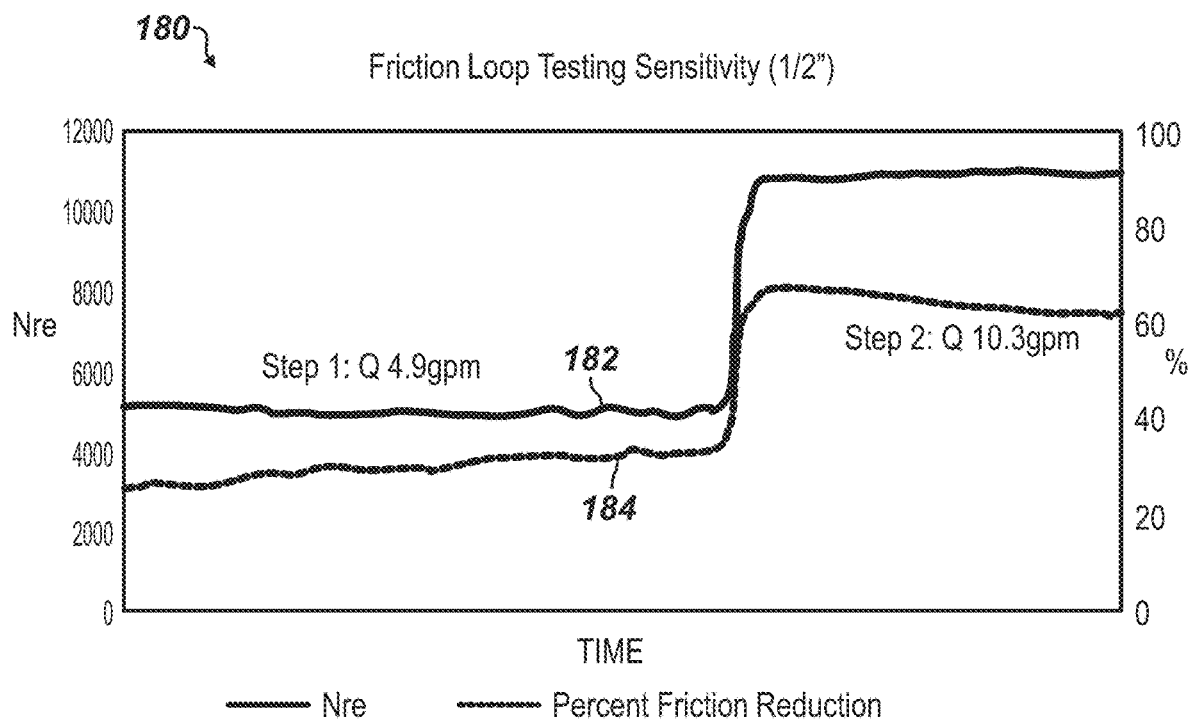

FIG. 11 graphs friction loop testing sensitivity conducted at several steps (pumping rates).

Figure 12A:
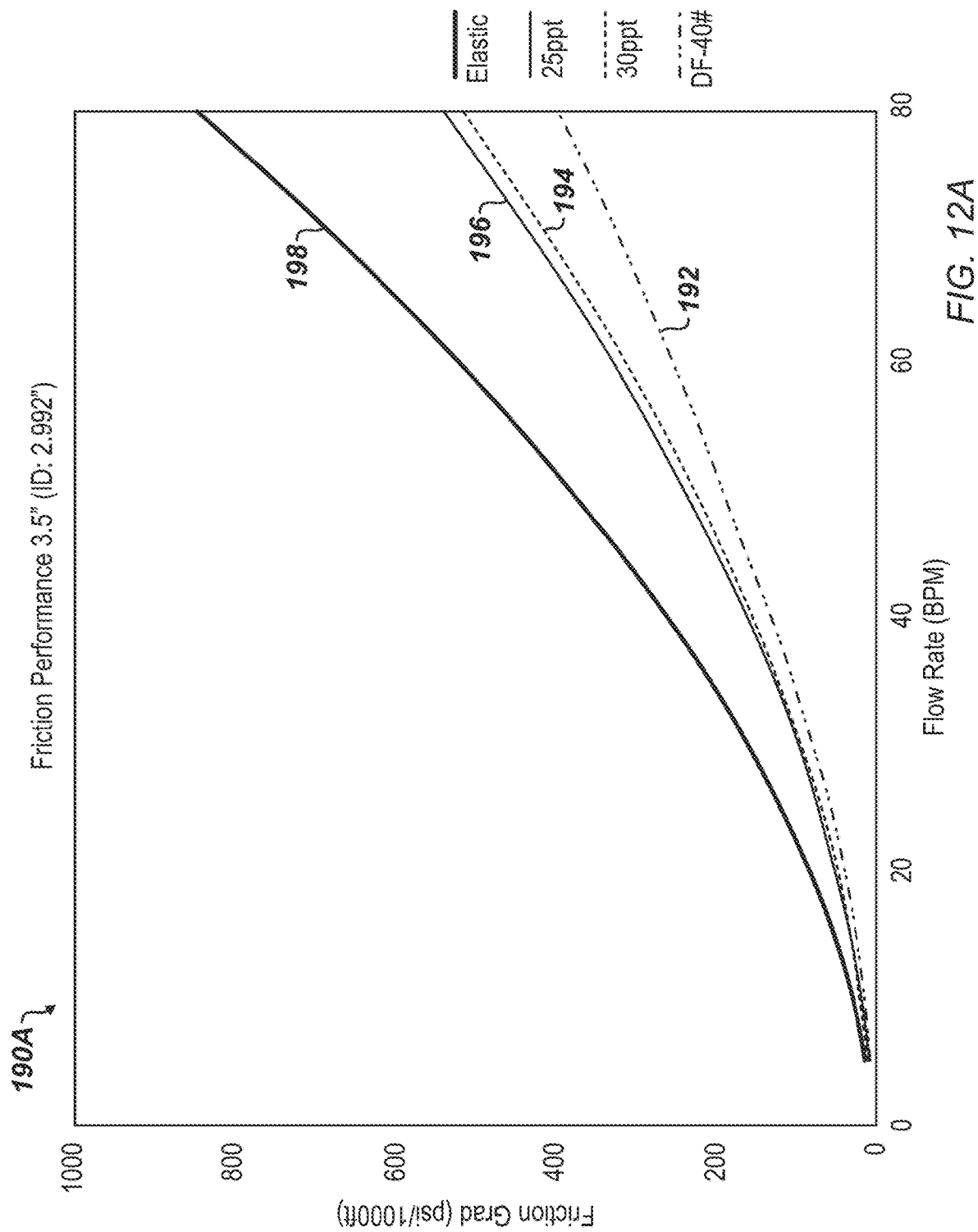
Figure 12B:
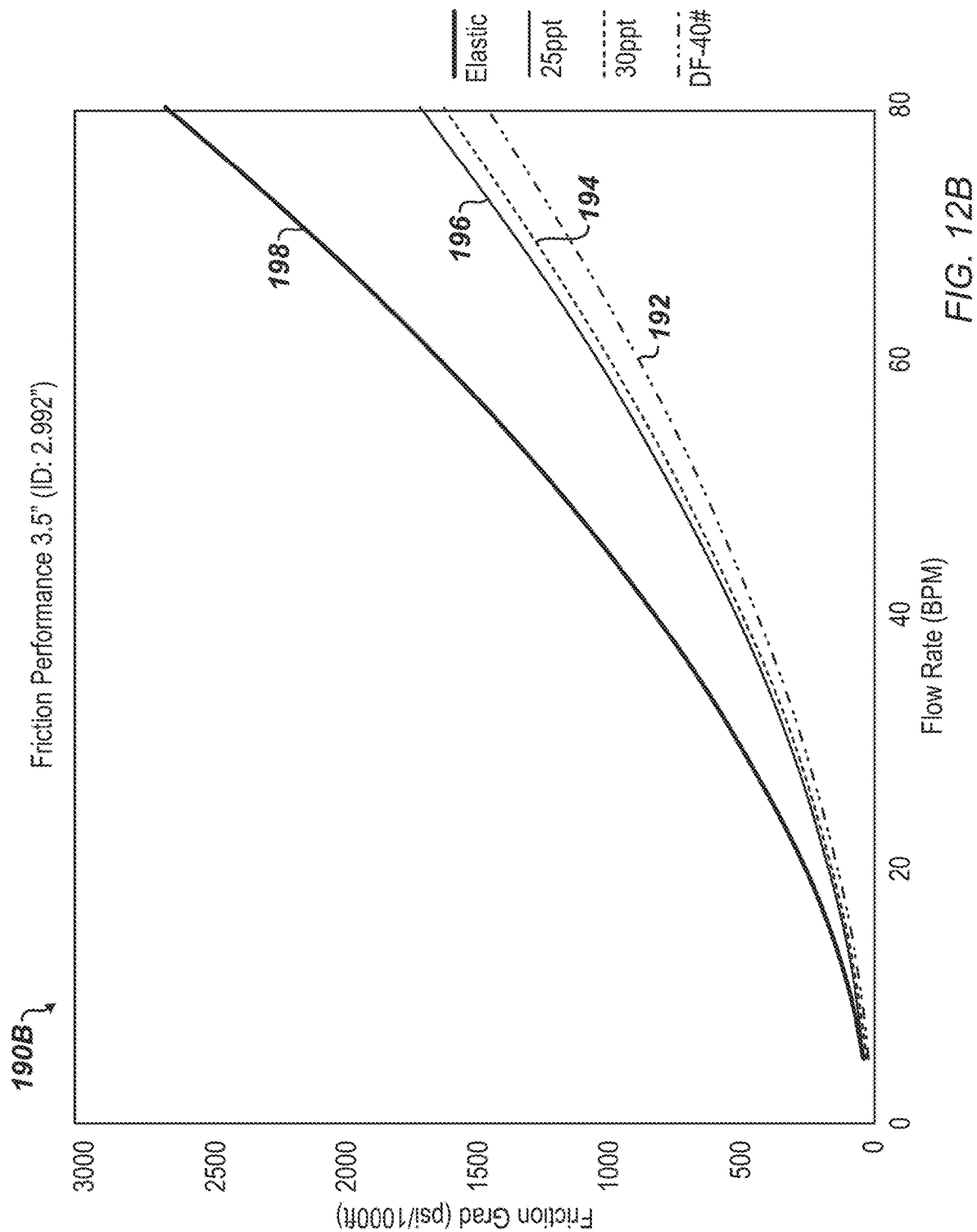

FIGS. 12A-12B graph analytical estimation of friction (psi/1000 ft) at different pumping rates based on two example pipe sizes.

FIG. 12B illustrates a friction performance assessment.

Figure 13:
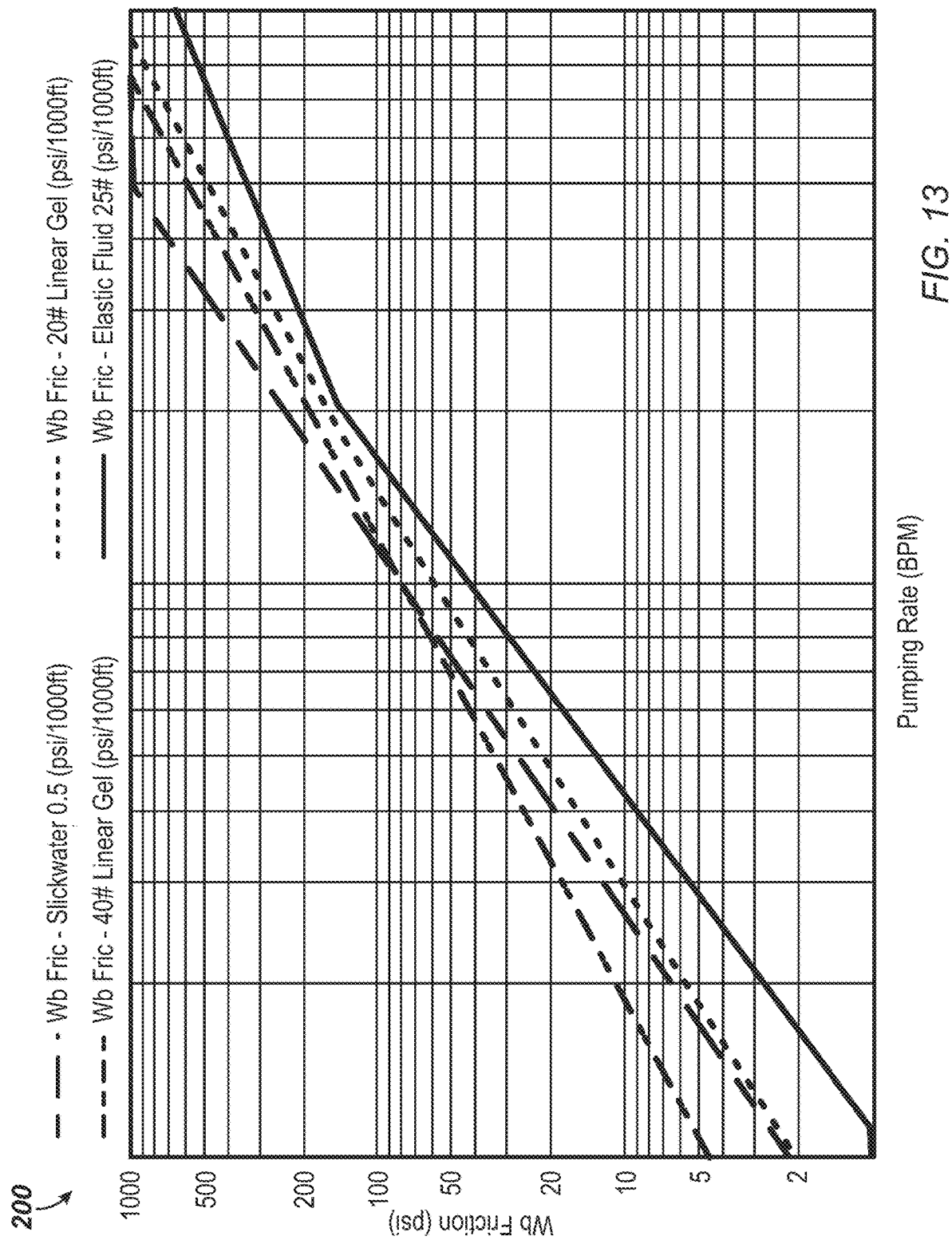

FIG. 13 illustrates friction calibration with the new analytical model.

FIGS. 14A-14B and FIGS. 15A-15B illustrate design review and testing results of the fracture aperture comparison from the analytical model.

Figure 16:
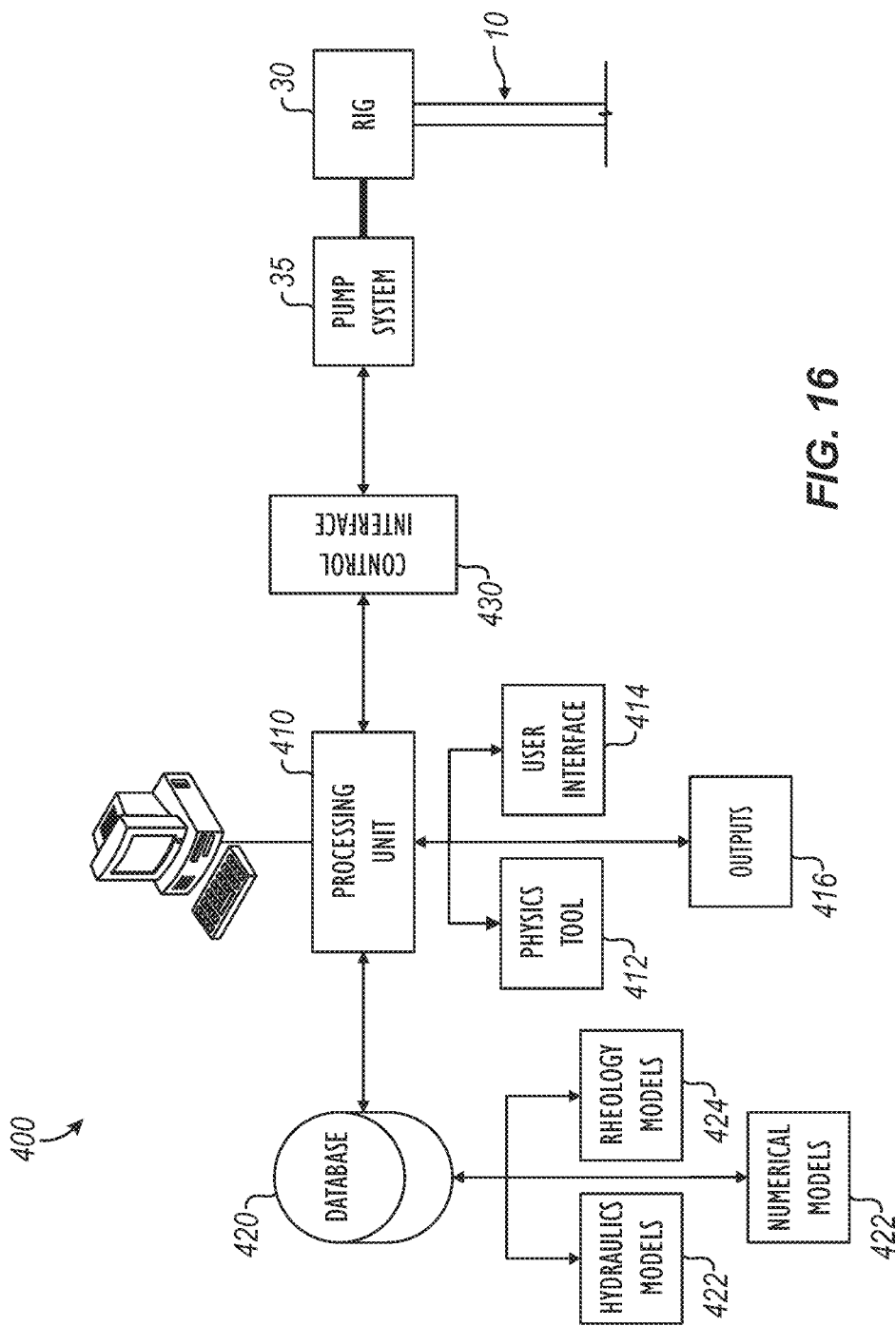

FIG. 16 illustrates a fracturing system having an integrated physics-based tool according to the present disclosure.

DETAILED DESCRIPTION OF THE DISCLOSURE

Figure 1:
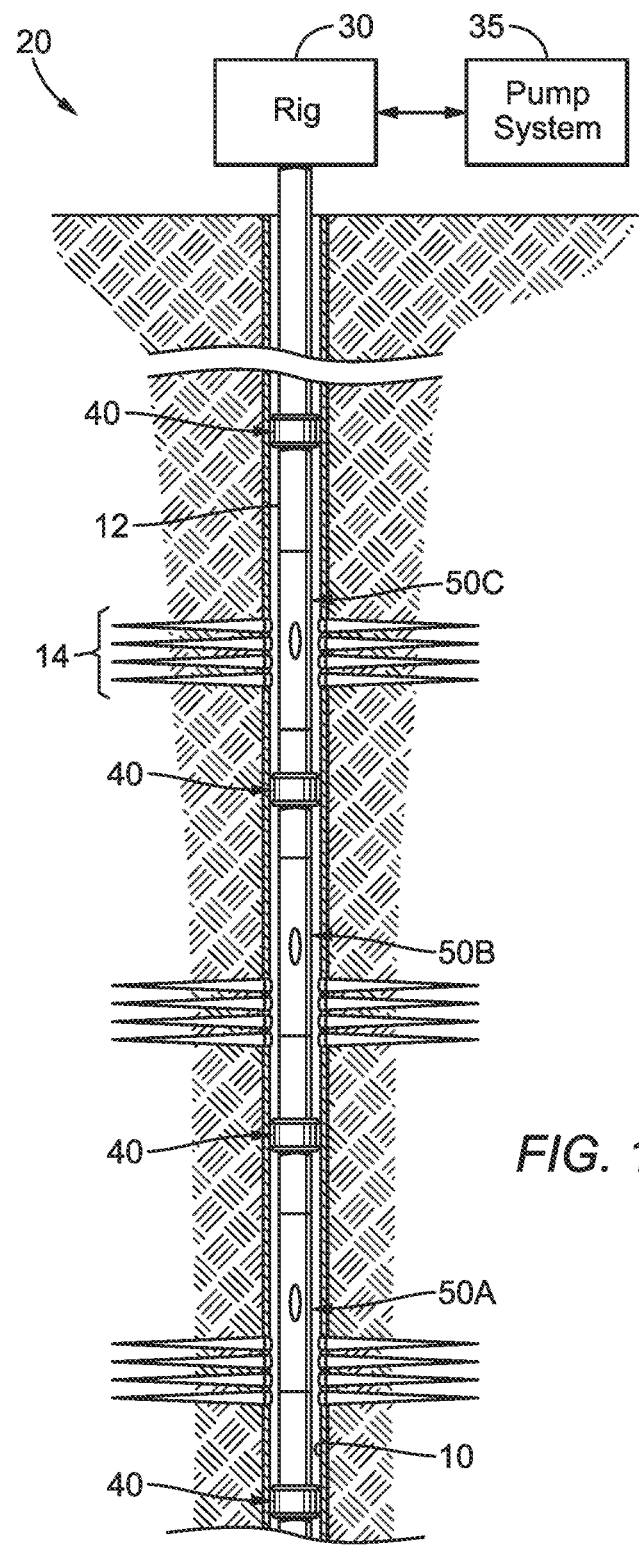
FIG. 1 is a schematic, cross-sectional view of a well undergoing a typical fracturing operation.

FIG. 1 illustrates a treatment system 20 according to one embodiment of the present disclosure for treating a formation intersected by a wellbore 10. A tubing string 12 deploys from a rig 30 into the wellbore 10. The string 12 has fracture sleeves 50A-C disposed along its length. Various packers 40 may isolate portions of the wellbore 10 into isolated zones. In general, the wellbore 10 can be an opened or cased hole, and the packers 40 may be any suitable type of packer intended to isolate portions of the wellbore into isolated zones.

The fracture sleeves 50A-C on the tubing string 12 between the packers 40 are initially closed during run in, but may be opened to divert treatment fluid to the isolated zones of the surrounding formation, as discussed below. The tubing string 12 may be part of a fracture assembly, for example, having a top liner packer (not shown), a wellbore isolation valve (not shown), and other packers and sleeves (not shown) in addition to those shown. If the wellbore 10 has casing, then wellbore 10 may have casing perforations 14 at various points.

As conventionally done, operators deploy a setting ball to close the wellbore isolation valve (not shown). Then, operators rig up the fracturing surface equipment at the rig 30 and pumping system 35 and pump fluid down the wellbore 10 to open a pressure-actuated sleeve (not shown) toward the end of the tubing string 12. This treats a first zone of the formation.

Then, in later stages of the operation, operators selectively actuate the fracture sleeves 50A-C between the packers 40 to treat the isolated zones depicted in FIG. 1. A number of mechanisms and techniques may be used to open the fracture sleeves 50A-C. In a typical arrangement, successively dropped plugs or balls engage a respective seat in each of the fracture sleeves 50A-C and create a barrier to the zones below. Applied differential tubing pressure may then be used to shift the respective sleeve 50A-C open so that the treatment fluid may stimulate the adjacent zone. Some ball-actuated fracture sleeves may be mechanically shifted back into the closed position. This affords the operator the ability to isolate problematic sections where water influx or other unwanted egress from the formation or a previously fractured zone may take place.

In treating the zones of the wellbore 10, fracture equipment of the rig 30 and pump system 35 at surface pump the treatment fluid (e.g., carrier fluid, fracture proppant, etc.) down the tubing string 12. In general, the rig 30 may have a fluid system, a launcher, and a pressure control assembly (i.e., blowout preventer, wellhead, shutoff valve, etc.). The launcher may be used to launch the plugs, such as darts, fracture balls, or other actuating devices, for opening downhole fracture sleeves 50A-C disposed on the tubing string 12. For its part, the pump system 35 includes one or more flow lines, pumps, control valves, a fluid reservoir (e.g., pit or tank), a solids separator, various sensors, stroke counters, and a proppant mixer.

The industry is currently implementing low-viscosity fracturing fluid alternatives to optimize friction loss and proppant placement. Increasingly, operators request a high-viscosity friction reducer that offers better carrying capacity than traditional friction reducers. Although production may be gained by this approach, the actual fracture models fail to predict the operational benefits in terms of hydraulic horse power as wells as the enhanced proppant placement offered by elastic fluids.

As discussed in detail above, hydraulic fracturing is widely utilized to improve hydrocarbon productivity from permeability challenged reservoirs. During a typical hydraulic fracturing treatment, a fracturing fluid is injected into a wellbore and injected into a rock formation at a pressure above the formation pressure so as to create tensile open area. Following the first initiation phase, proppant is added to the fracturing fluid and injected into the newly created open area to prevent it from closing during production and also to provide conductive flow paths for hydrocarbon extraction from the target area. The overall success of the fracturing treatment and induced fracture characteristics (such as length, height, extent, and conductivity) are dependent on the rheological properties of the fracturing fluid which also influences proppant transport, distribution and mechanical behavior within the developed hydraulic fracture and/or reactivated natural fractures. Therefore, if rheological behavior is not properly modeled, it will fail to provide accurate results.

Currently, high concentrations and/or high-strength proppants are typically used in the industry to minimize proppant embedment and crush and hence the fracture closure risk. However, in order to utilize high proppant concentrations and/or high-strength proppants, the rheological properties of the fracturing fluid must be carefully chosen in order to transport the proppant to where it is most needed in the reservoir so as to maximize long-term production. When a low-viscosity fluid (such as slick water) is selected, the hydraulic fracture could be initiated, propagated and well-contained within the pay zone, depending on the leak-off rate, however, high concentration and/or high-strength proppant tends to settle and accumulate on the bottom of the developed fractures which may greatly diminish the treatment efficiency. Thus, to carry a high concentration and/or high-strength proppant and provide relatively uniform distribution throughout the complex fracture network, the classical approach would be to use a high-viscosity fluid. Using a high-viscosity fluid may mitigate the proppant settling issue; however, it may also lead to: higher required pumping horsepower; lower propped fracture length with abnormally greater fracture height; lower conductive reservoir volume with less natural fracture reactivation due to higher friction inside the fractures; and, greater formation damage caused by residual polymer residue.

In order to overcome these obvious shortcomings, the present disclosure provides an integrated physics-based analytical and numerical tool to model elastic fluid design with complex rheological properties that may replicate a low viscosity fluid while exhibiting the high proppant-carrying capacity of crosslinked systems (i.e., highly viscous fluids). The newly developed fracturing model can simulate proppant delivery into the natural fracture networks without the use of high pumping horsepower requirements, which is often encountered when running conventional highly viscous fluids. In summary, in order to maximize the stimulation efficiency of a reservoir, there is a need for a new fracturing fluid model that can capture the physics of elastic fluids to transport high concentration and/or high-strength proppant using a hybrid rheology model.

Furthermore, the fluid design and proppant selection strategy should be customized and evaluated based on the local geological and formation characteristics. If engineered accurately, a fit-for-purpose fluid may well distribute the selected proppant into the fracture surface, which may sustain closure stresses by reducing embedment and/or crush risk, and result in longer effective fracture length(s) and larger conductive reservoir volume with enhanced conductivity and hence production. Thus, there is a need for an integrated reservoir geo-mechanics-fluid model that is capable of providing an optimized design and/or evaluating and improving existing designs based on the reservoir properties and instrument limitations by iteratively optimizing relevant aspects/controls (such as fluid design, proppant type, pumping schedule) of a fracturing operation.

In the past, high-viscosity fluid (greater than 500 centipoise) has been the preferred solution for increased proppant transport and reduced proppant settling. This methodology has been effective using systems such as a borate-crosslinked fluid with a polymer loading of 40 lbs. per 1000 gallons of water and offers what the industry considers a standard for low-rate pumping with high proppant transporting, 40 BPM and >5 ppg, respectively. The downside of high polymer loads of guar is that they commonly increase formation damage created in the fracturing process, typically resulting in less than 80% percent regain permeability value. While this may be acceptable, there are other setbacks, such as additional loss of needed fracture length is commonly observed when high-viscosity fluids are utilized to carry proppant. However, greater fracture geometry width is often considered a common characteristic of high viscosity fluids. Often, with low-viscosity fluids such as linear gels and friction reducers, fracture length may be established allowing breaks into the secondary fracture and mechanical reactivation of the pre-existing natural fracture network may be enhanced due to the interaction between natural fractures and propagating hydraulic fractures. Each individual natural fracture within the fracture network can reactivate in opening, slip or a combined mode with greatly increased fracture conductivity, which allows the fracturing fluid together with proppant to be diverted from the propagating hydraulic fractures into the fracture network. However, these fluids do not offer suspending characteristics past 30 minutes under static conditions. When applied to fracture geometry, this loss of suspending ability causes proppant to fall from suspension resulting in loss of uniform proppant placement and induce early closure (fracture choke) at the location with less proppant coverage. As for the complex fracture geometry, the loss of suspending ability may also cause blockage at the intersection between the reactivated natural fractures and hydraulic fractures, introduce additional pressure loss, and consequently reduce the proppant transport efficiency and form potential choke points with the fracture network. In instances where fracture gradients are high, high-viscosity fluids are often used to allow for lower treating rates. This approach is often taken with high viscosity fluids, but added treatment pressure may be required on surface, resulting in additional pumping horsepower requirements.

A secondary approach (and a more recent industry option) is the use of a high-viscosity friction reducer. As compared to guar-based systems, the viscosity of such fluids is far lower. However, proppant transport in such systems is not comparable to either alterative fluid systems or borate-crosslinked systems. When attempting to replicate the suspending properties of alternative fluid systems or borate cross-linked systems with a friction reducer with the conventional fracture models, it is not possible to replicate the synergistic effect between shear rate and proppant suspension performance.

The trend in the industry has been to obtain a high suspending characteristic fluid [as defined above] by increasing the fluid viscosity to more than 500 cP. Although this may be effective, fracture geometry may be adversely affected to a great extent. In contrast, the characteristics of a fluid according to the present disclosure are that of a low-viscosity system (similar to those of a linear fluid) but with suspending behavior, which may be better than even twice the weight of active polymer. Significantly, the fluid of the present disclosure may exhibit suspending behavior greater than that of a 1000-cP system, yet may have an actual viscosity less than 100 cP.

Reservoir concept models indicate that the elastic fluids simulated in the present disclosure may actually suspend and carry the proppant within the main hydraulic fractures as well as place proppant into reactivated natural fractures. In an additional advantage, the low-viscosity behavior of the disclosed fluid may actually minimize the pumping horsepower required during a fracturing operation, reduce water utilization, and may improve the proppant coverage when carrying large/heavy proppant, keeping the proppant in the desired place, enhancing the conductivity of the stimulated fracture and reactivating natural fractures. With a low-viscosity fluid, for example, the pumping horsepower required on location during a fracturing operation is lower than that of a cross-linked fluid job. The high-viscosity fluids of the prior art require additional pumping horsepower on location to combat the added frictional pressure loss of high viscosity fluids such as crosslinked fluids where a viscosity no less than 200 cP may be reached on surface. This, along with other cross-linked fluids, may cause treatment rates to be reduced to compensate for the higher treatment pressure (especially when frac gradients are high).

Elastic fluids modeled for the present disclosure provide low viscosity and yet more effective proppant transporting thereby keeping the proppant more effectively suspended and reducing perf bridging and proppant settling better than crosslinked fluids. By contrast, low-viscosity fluids such as high-concentration friction reducers and linear gelling agents like guar are common, but do not allow proppant to be placed as effectively in fractures as the fluid of the present disclosure does. In terms of injection pressure, the fluid of the present disclosure is consistent with a conventional low-viscosity fluid, such as a friction reducer. However, it may have more than double the proppant-suspending power, which mitigates proppant settling within the fracture geometry, especially within a complex fracture network.

Elastic fluids such as high-concentration friction reducers may allow proppant to be placed effectively in fractures considering low injection pressure, as long as the carrying capacity is maintained at different temperature and flow conditions to avoid proppant settling within the fracture geometry, and transport into a complex fracture network.

Figure 3A:
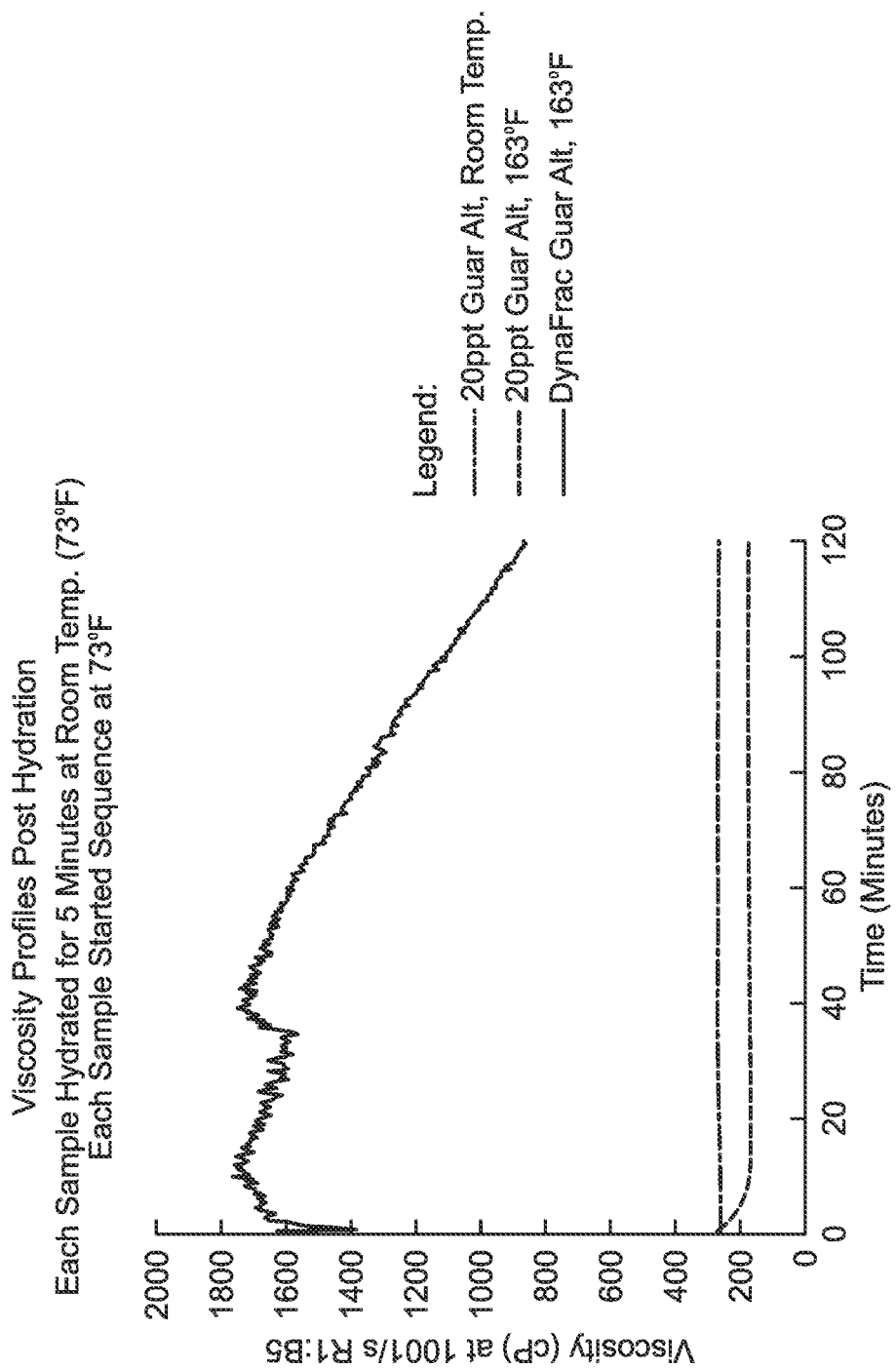
FIG. 3A is a graph showing the viscosity of certain fluids versus post-hydration time.
Figure 3B:
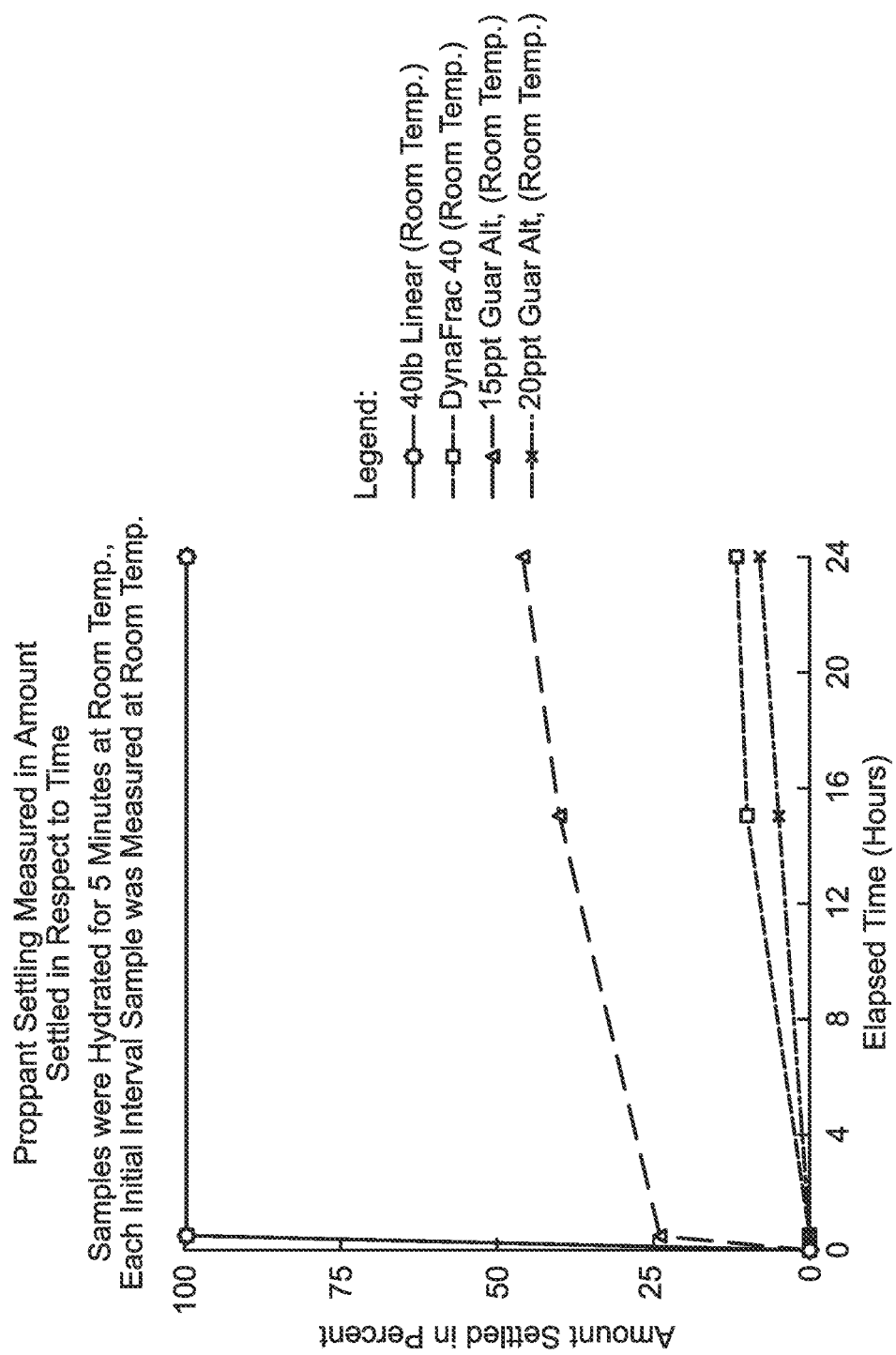
FIG. 3B is a graph showing proppant settling versus time for various fracturing fluids.
Figure 3B:
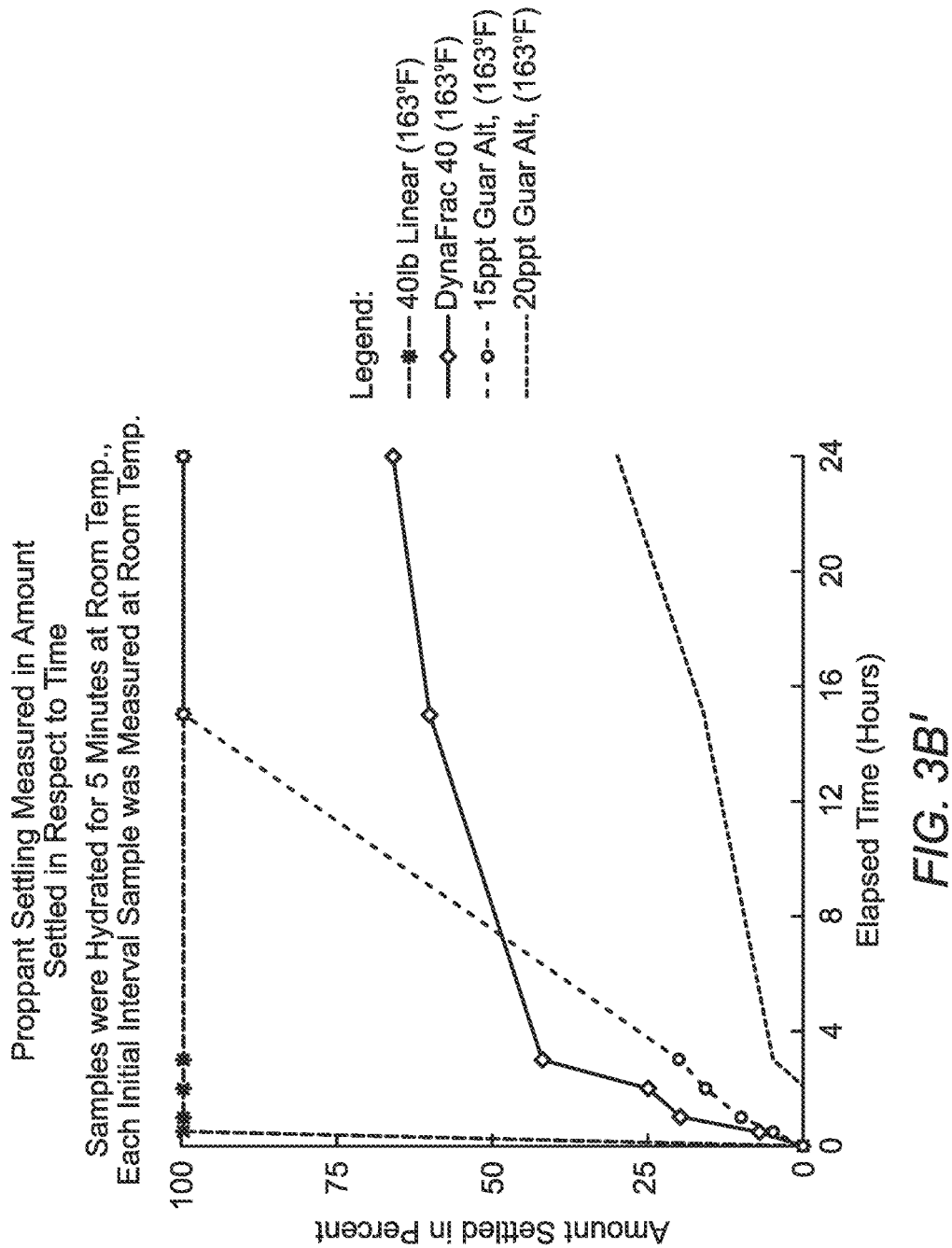

FIG. 3A illustrates the apparent viscosity of an elastic fluid used for the cases simulated with the present disclosure in reference to the API 39 statement and provides a viscosity comparison of borate/guar fluid and a fluid according to the present disclosure. It shows the viscosity versus time of DynaFrac which is a 40-lb. borate/guar system at 163° F. and that of a fluid according to the present disclosure is shown at both room temp and at 163° F. FIG. 3A when referenced to FIG. 3B illustrates that, merely because a fluid yields high viscosity, proppant settling is not necessarily improved over a low-viscosity fluid.

In addition, it will be appreciated that, because of the low viscosity of a fluid according to the present disclosure (as compared to a borate/guar system), less horsepower on surface is needed due to pumping fluid dynamics of viscosity principle.

Figure 4:
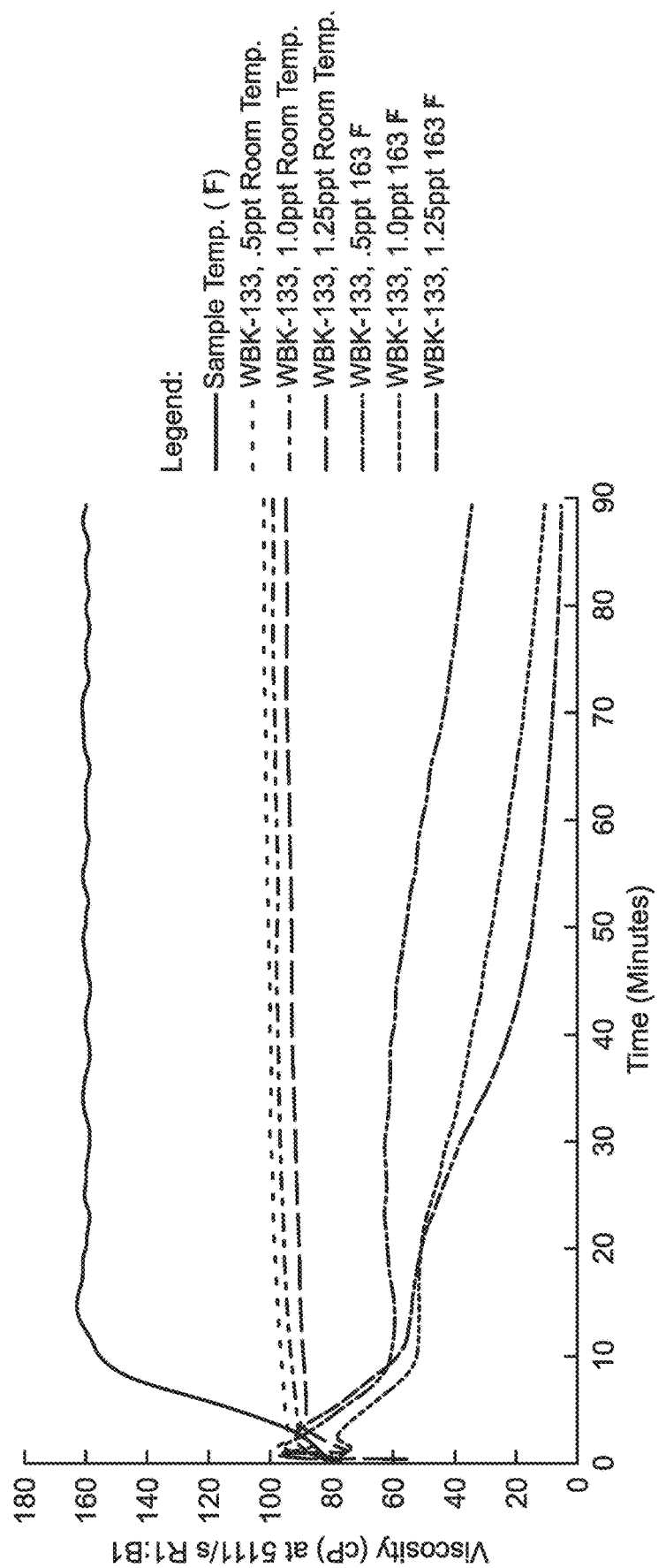
FIG. 4 is a graph showing breaker profiles for various fracturing fluids as viscosity versus time.

FIG. 4 shows that a new fluid of the present disclosure may not be affected in terms of viscosity at surface temperature when breaker is introduced. Often, in guar systems and true slickwater, breaking behavior begins to occur even at surface temperature. A system according to the present disclosure may be broken with ammonium persulfate breaker.

Figure 5:
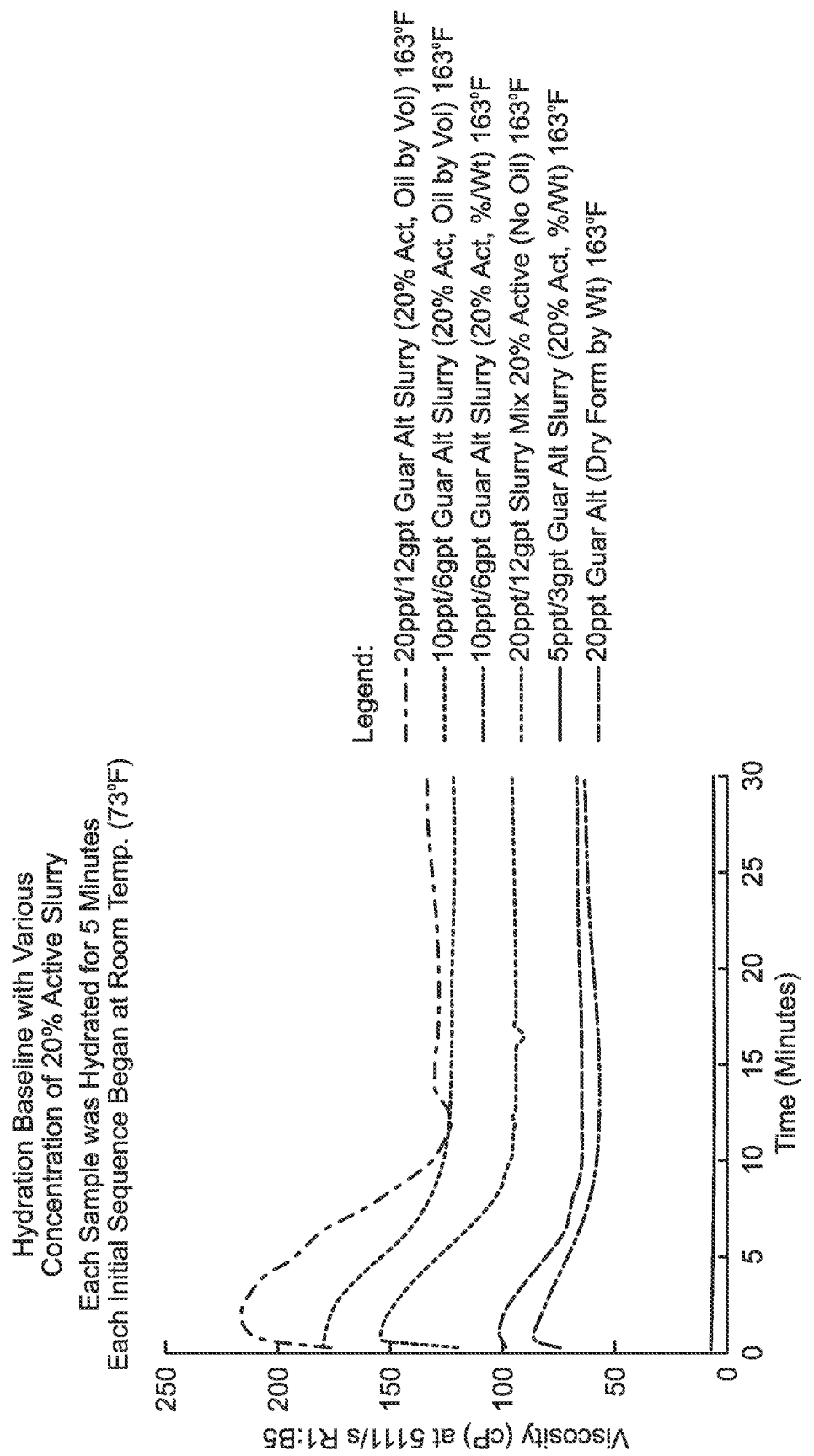
FIG. 5 is a graph showing hydration baselines for various additive concentrations as viscosity versus time.
Figure 7A:
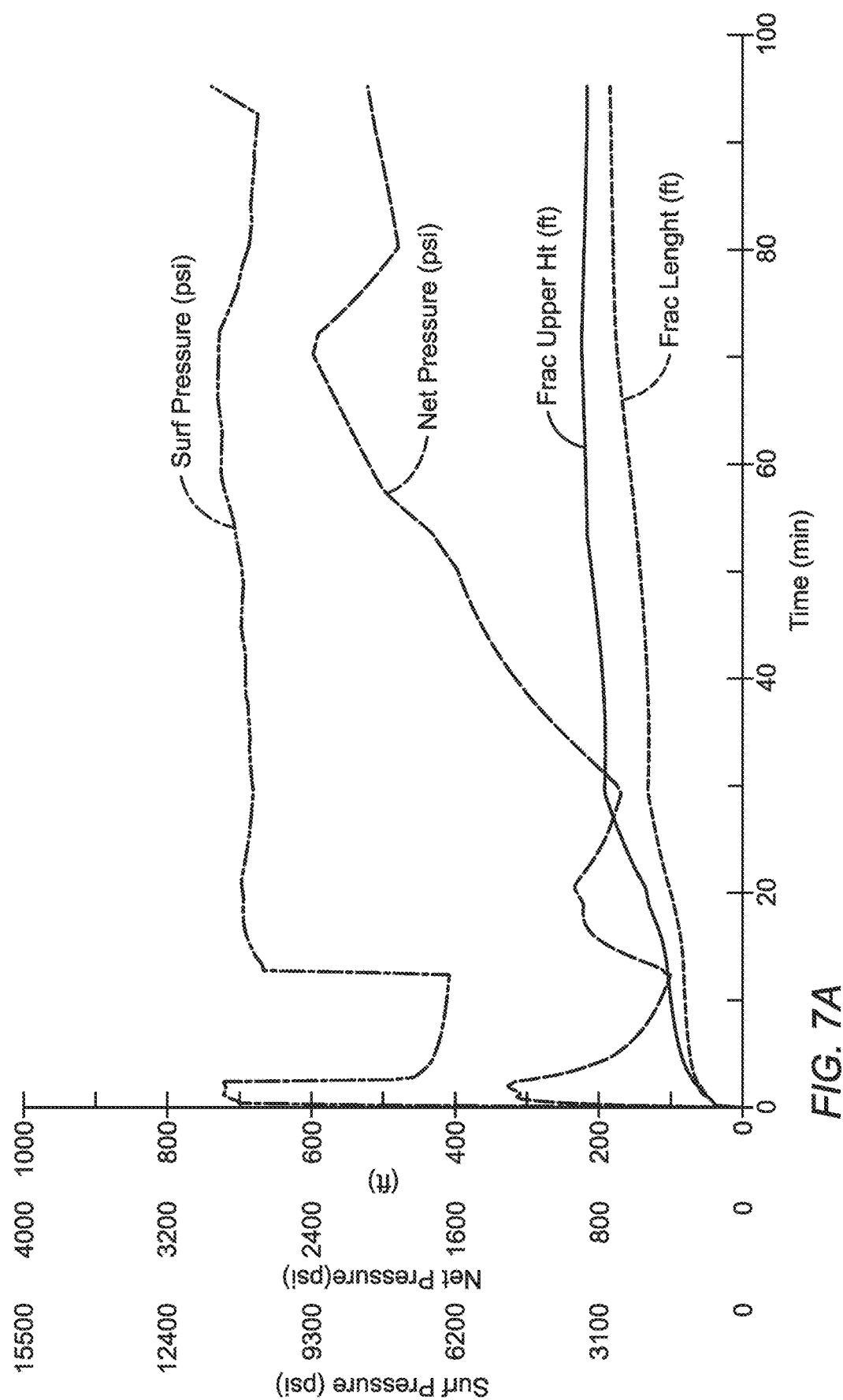
FIG. 7A is the graphical output of a computer simulation of surface treating pressure calculations and related fracture dimensions for a fracturing fluid according to the present disclosure used at a level of 15 lbs. of the polymer per 1000 gallons of water (PPT).
Figure 7A:
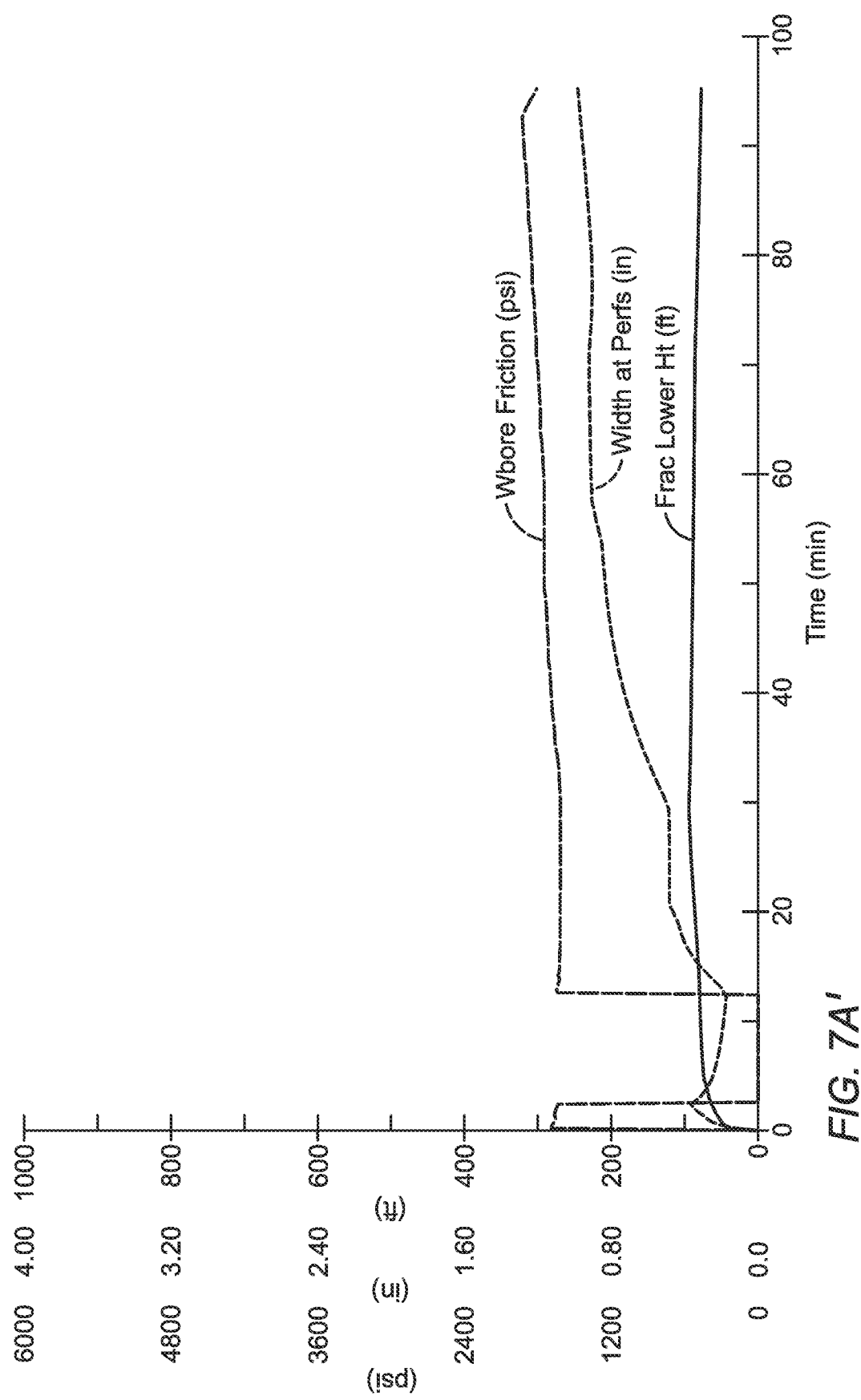
Figure 7B:
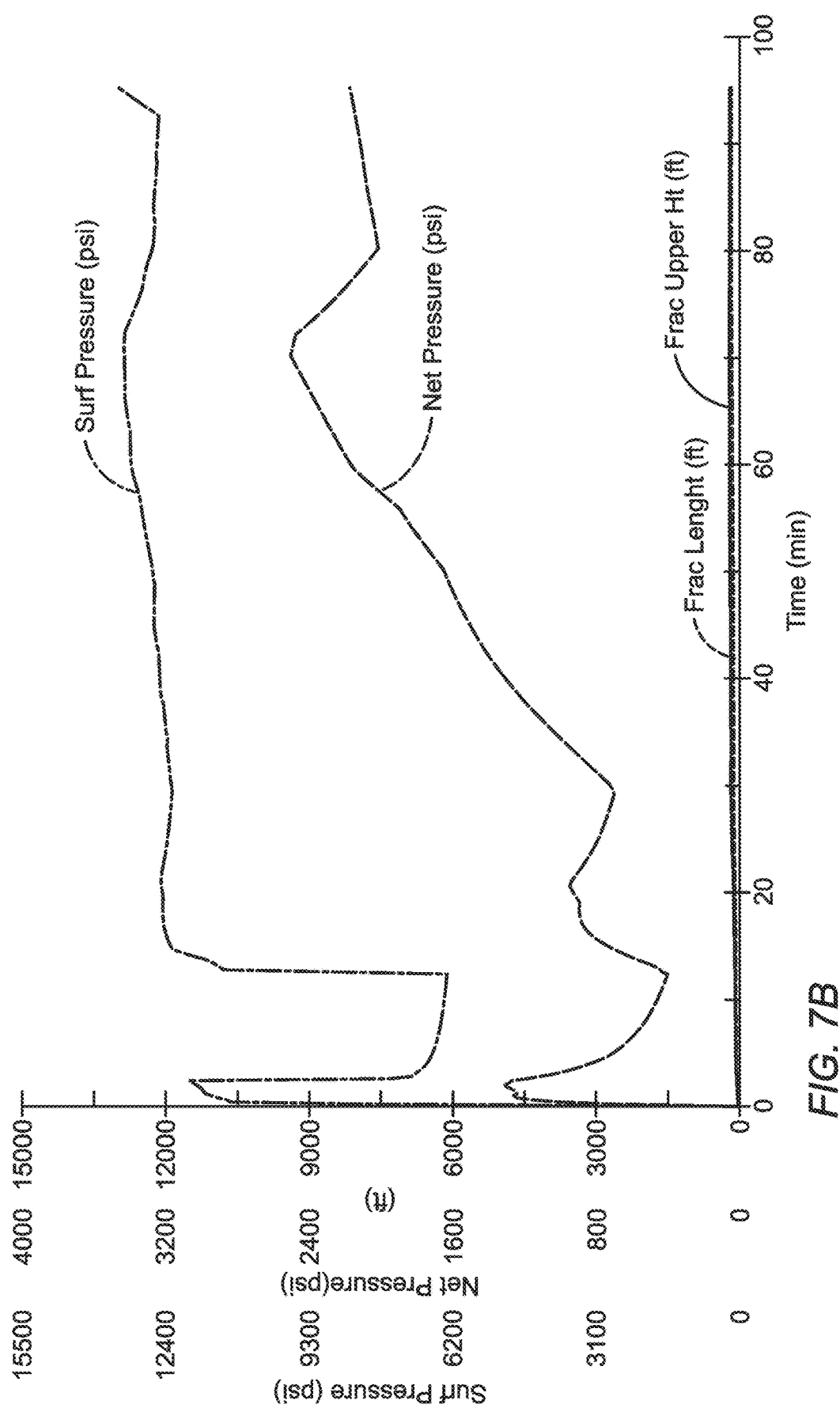
FIG. 7B is the graphical output of a computer simulation of surface treating pressure calculations and related fracture dimensions for a linear gel fracturing fluid system that comprises natural guar or a low-residue hydroxypropyl guar (HPG) at a level of 40 lbs. per 1000 gallons of water.
Figure 7B:
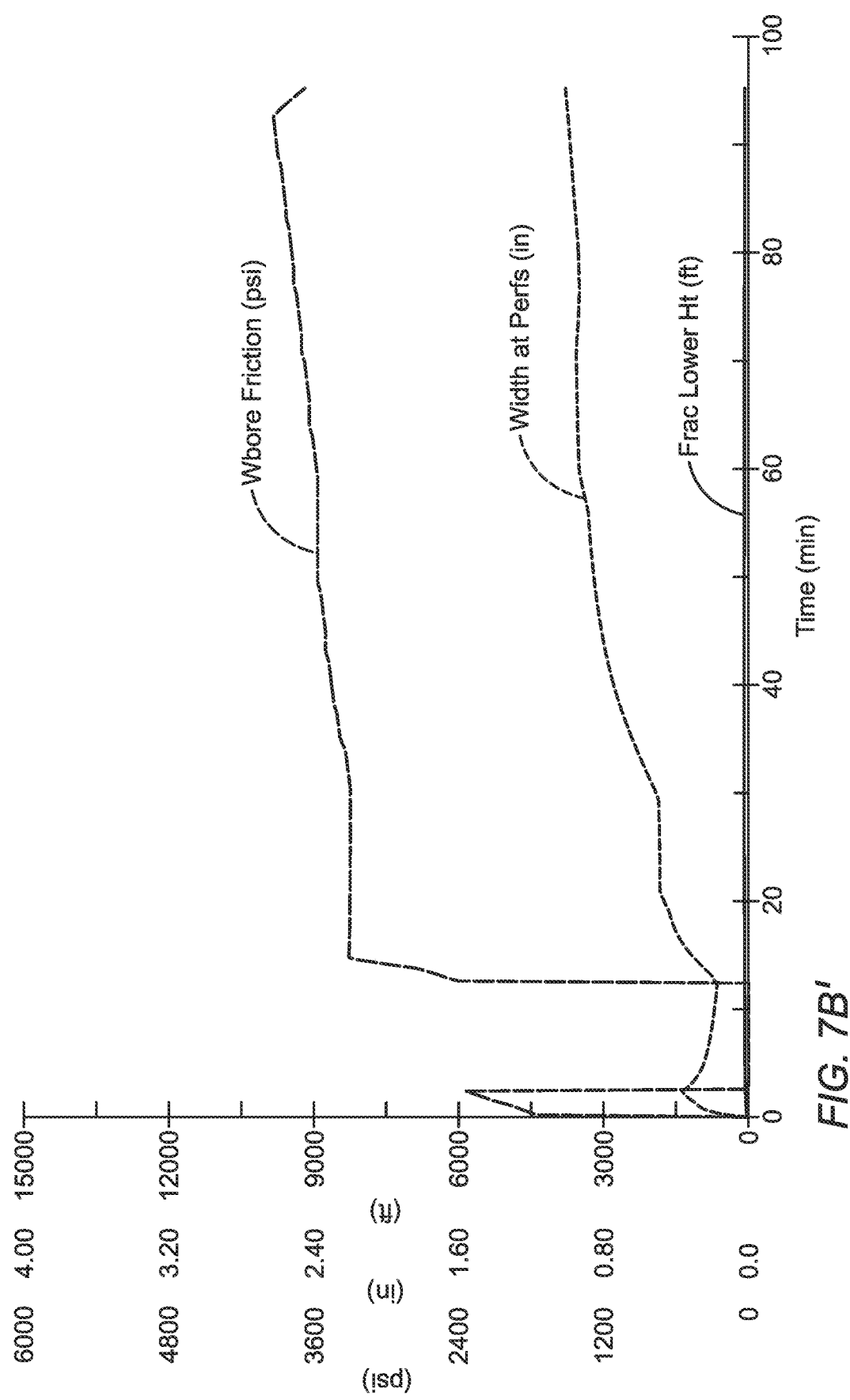
Figure 7C:
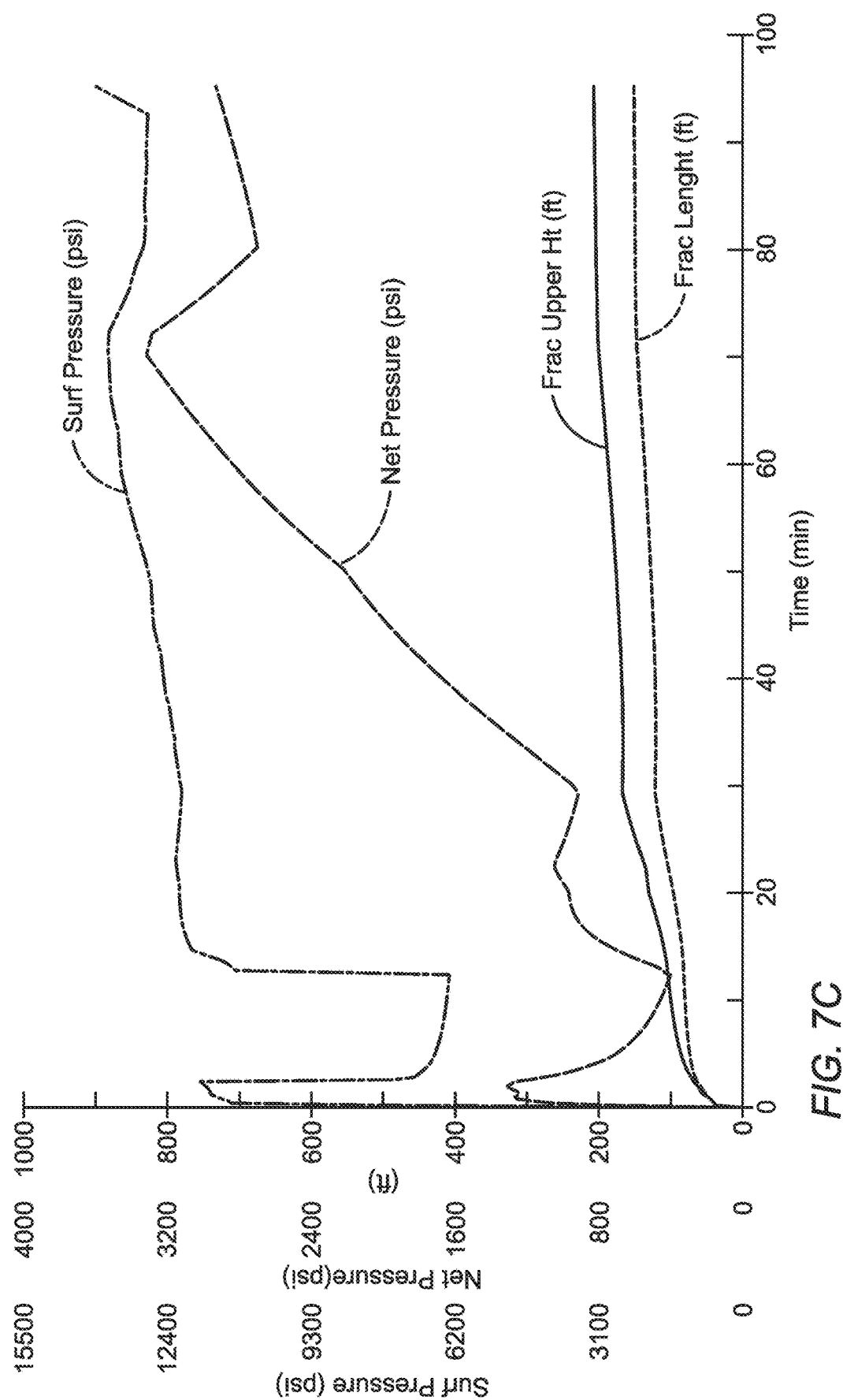
FIG. 7C is the graphical output of a computer simulation of surface treating pressure calculations and related fracture dimensions for a CHMPG/zirconium (carboxymethylhydroxypropyl guar gel) fracturing fluid system at a level of 40 lbs. per 1000 gallons of water.
Figure 7C:
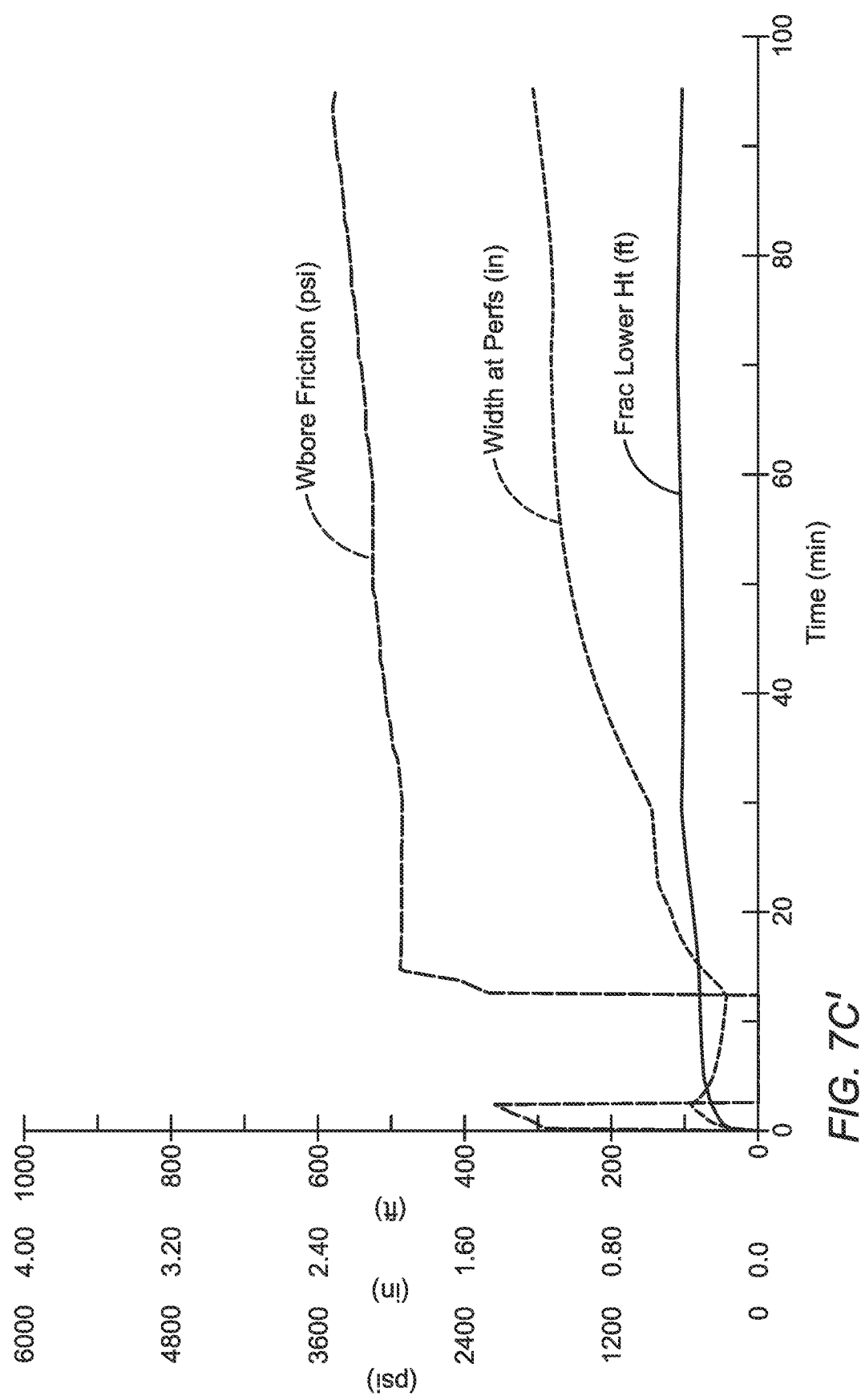
Figure 7D:
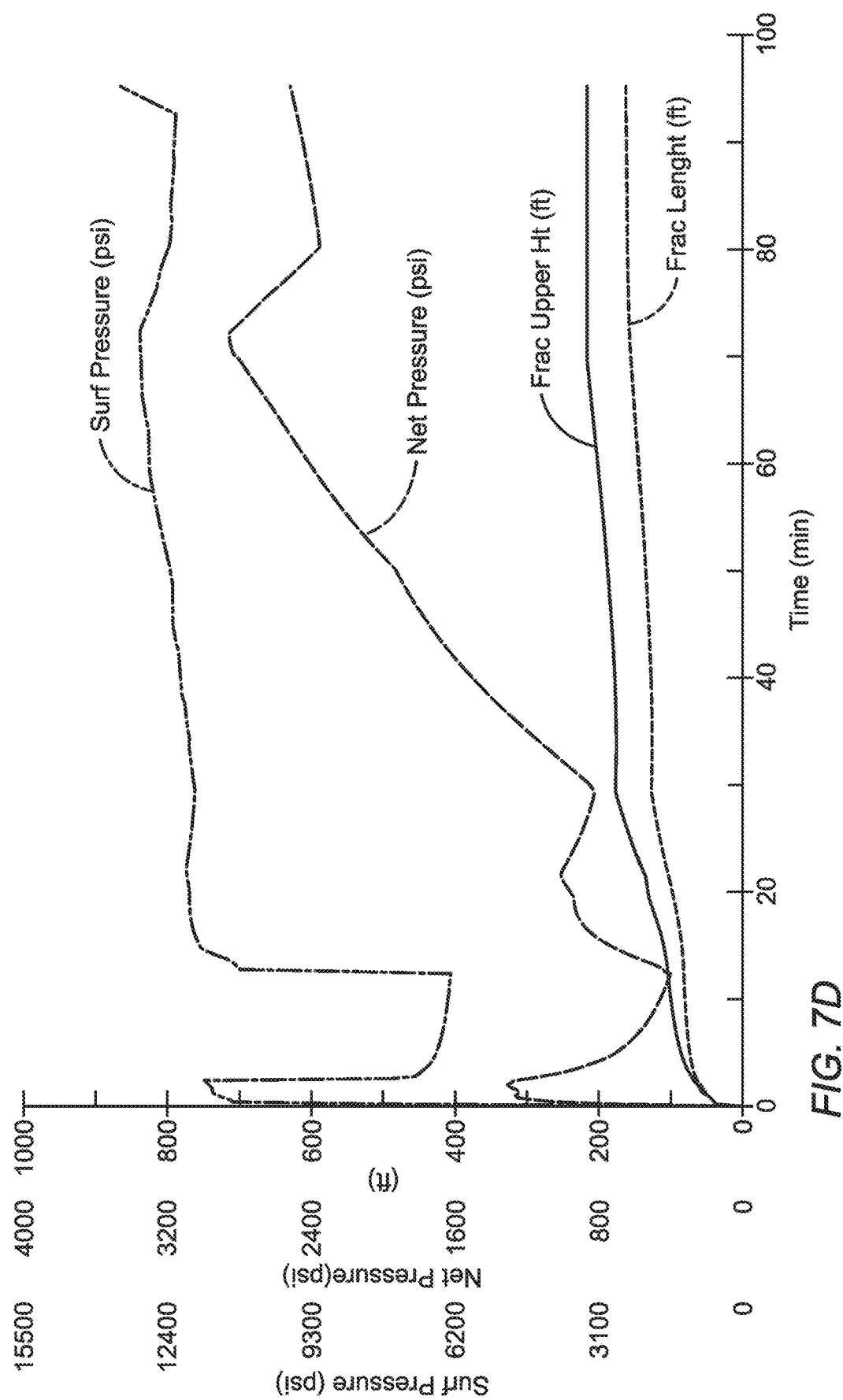
FIG. 7D is the graphical output of a computer simulation of surface treating pressure calculations and related fracture dimensions for a delayed borate crosslinked fracturing fluid system at a level of 40 lbs. per 1000 gallons of water.
Figure 7D:
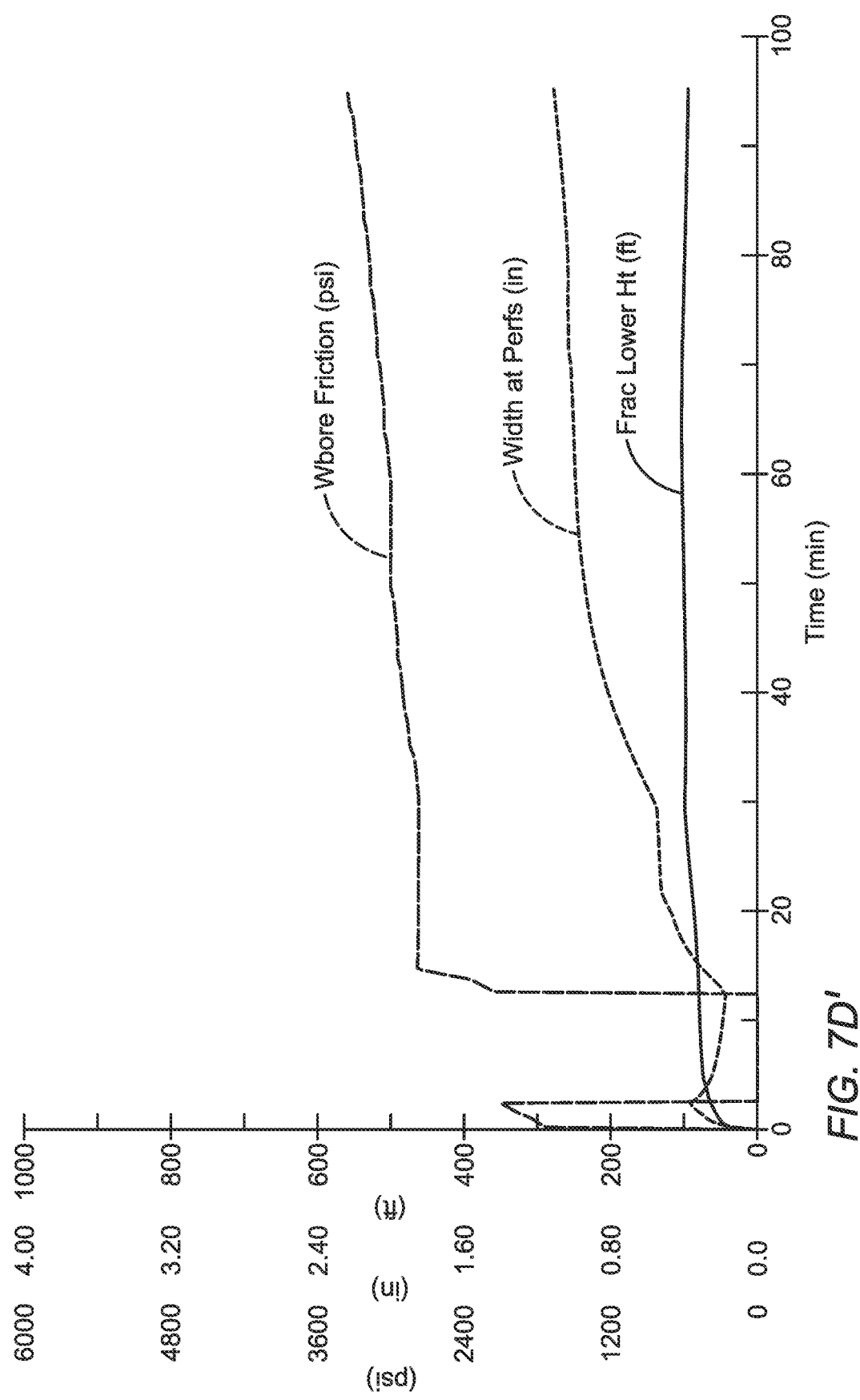

FIG. 5 illustrates making active co-polymer into a slurry form for easier field deployment and pumpability. Due to the surfactant and clay components used when making a slurry, the active co-polymer disperses more effectively into solution. This is illustrated where a 15-lb. slurry system yields a more effective viscosity than when a 20-lb dry form a/k/a co-polymer used alone.

Referring now to FIGS. 6A-6C, computer simulation results of fracturing operations using a conventional high viscosity fluid (a borate-crosslinked guar-based system), a conventional low-viscosity fluid (slickwater), and the elastic fluid for the present disclosure are shown, respectively. In FIGS. 6A-6C, "NF" denotes natural fractures and "HF" denotes hydraulic fractures. Proppant dispersion is shown as a "heat map" wherein red areas have a high proppant concentration and blue areas have a low proppant concentration. Green and yellow areas have intermediate proppant concentrations. The ideal solution is a low-viscosity fluid which has high proppant carrying capacity while requiring relatively low power for injection.

The simulation results presented in FIGS. 6A-6C are based on the use of a 3-D reservoir scale fracturing simulator to model hydraulic fracture propagation, natural fracture reactivation and proppant transport within both hydraulic fracture and reactivated natural fracture networks.

State-of-the-art numerical simulations for fracturing are based on coupled Fracture Mechanics (FM) and Fluid Dynamics (FD). FM is a branch of solid mechanics that uses algorithms as well as numerical analysis to analyze (or solve) fracture propagation inquiries or problems. FM applies the theories of elasticity and plasticity to predict the rock failure behavior with respect to intrinsic mechanical properties and boundary conditions. FD is a sub discipline of fluid mechanics that may be used for simulating interactions involving fracturing fluid flow, fracture surfaces, proppant transport and boundary conditions. Fracturing fluid and proppant flow within a complex fracture network and the induced stress generated by fracture propagation and deformation are fully coupled in the 3-D reservoir scale fracturing simulator. Coupled FM and FD analysis may be used to understand and evaluate the influence of the proppant-carrying capacity of fluid and pumping strategy on the proppant transport efficiency in a complex fracture network. For example, coupled FM and FD may be used in some embodiments for optimizing the parameters affecting the proppant distribution within a developed fracture network such as, for example, injection rate, injection duration, proppant type and proppant concentration in the fluid.

Figure 2:
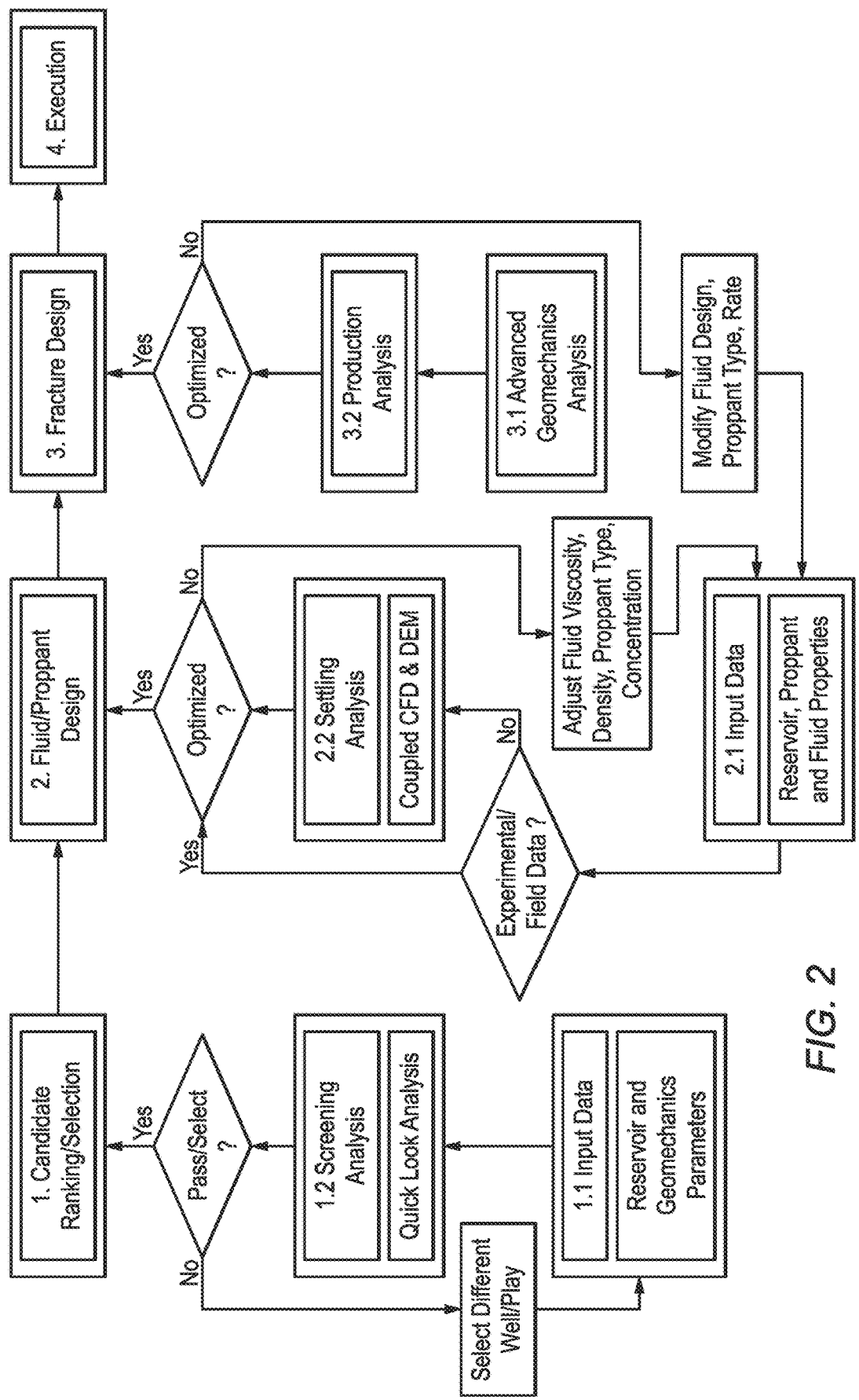
FIG. 2 is a flowchart depicting an integrated fluid-geomechanics workflow according to an embodiment of the present disclosure.

To evaluate and quantify the efficiency of a proppant transport process using an elastic fluid in the present disclosure, an integrated geo-mechanics workflow comprised of multiple modules may be used, as shown in FIG. 2. Again, FIG. 2 illustrates the integrated workflow for modeling a hybrid flow behavior of a subject elastic fluid according to the present teachings. The workflow for the hybrid flow behavior can model unique properties of an elastic fluid, such as disclosed herein, whose physics complexities cannot be captured by current industry rheology models.

In general, this workflow combines quick-look analysis (i.e. candidate selection) with advanced computational models (i.e. CFD-DEM [computational fluid dynamics—discrete element method] and geo-mechanical models) to provide operational guidelines to improve proppant deliverability and maximize production. Multiple analytical and numerical models and/or modules may be combined within the framework of the workflow to assess the design efficiency and customized fluid properties of the present disclosure.

Certain embodiments of this disclosure iteratively employ analytical and numerical functions and modeling, for example to run simulations and obtain the results thereof. In particular, as discussed in further detail below, specifically directed use of coupled Computational Fluid Dynamics (CFD), Discrete Element Methods (DEM), and analytical models may be used to create custom design and verify the experimental results on new fluid proppant carrying capacity characteristics.

Using logs and real-time log files obtained from an actual well in Argentina, simulations of pumping rate, fracture geometry, and hydraulic horsepower (HHP) requirements were performed. In each case, the elastic fluids according to the present disclosure has shown to require less HHP than other representative fracturing fluids.

TABLE 1 presents simulation data using a pumping rate of 40 BPM as a baseline to provide an idea of HHP requirements at a low rate. It will be appreciated by those skilled in the art that a pumping rate of 40 BPM is not realistic for the proppant (at 5 PPG) used in actual slickwater (friction reducer) field applications. However, the new fluid is still shown to be more efficient in terms of lower hydraulic horsepower required and greater propped fracture coverage.

TABLE 1

| Fluid | PPG | Rate BPM | Avg. PSI | Frac Length (ft.) | prpL | Total fract height | Total prop. Ht. | Perf W | HHP |
|---|---|---|---|---|---|---|---|---|---|
| Guar | 1-5 | 40 | 11,170 | 118.7 | 92.7 | 253.8 | 198.3 | .304 | 10,950 |
| Slickwater | 1-5 | 40 | 9978 | 147.6 | 77.3 | 253.0 | 196.0 | .262 | 9782 |
| Borate/Guar | 1-5 | 40 | 10,850 | 121.0 | 92.5 | 245.9 | 188.0 | .336 | 10,637 |
| New fluid | 1-5 | 40 | 9550 | 121.7 | 114.4 | 253.1 | 186.4 | .312 | 9363 |

The simulations presented in TABLE 2 applied what would be the minimal pumping rate required to successfully pump a well without screening out and/or bridging off perforations. This is more so focused when linear gelled fluids and or slickwater fluids are applied (both were considered in determining pumping rate, with an error factor of 10%).

TABLE 2

| Fluid | PPG | Rate BPM | Avg. PSI | Frac Length (ft.) | prpL | Total Frac height | Total prop. Ht. | Perf W | HHP |
|---|---|---|---|---|---|---|---|---|---|
| Guar | 1-5 | 60 | 12,982 | 125.1 | 92.9 | 267.1 | 198.3 | .418 | 19,091 |
| Slickwater | 1-5 | 90 | 12,444 | 127.2 | 93.2 | 275.0 | 201.5 | .466 | 27,449 |
| Borate/Guar | 1-5 | 55 | 12,267 | 121.4 | 90.3 | 255.0 | 190.0 | .650 | 16,536 |
| New fluid | 1-5 | 45 | 10,529 | 123.0 | 118.5 | 258.4 | 198.0 | .314 | 11,613 |

The simulations presented in TABLE 3 utilized the actual pump schedule that would likely be used with the new fluid. Inasmuch as the job being modeled required a low rate and high proppant amounts to pump proppant away, slickwater was not considered. At 5 ppg, proppant is falling quicker than fluid at 60 BPM. Use of the new fluid according to the present disclosure is shown to reduce required HHP by the equivalent of two trucks having skid-mounted pumps and the equivalent of four trucks having body-loaded pumps.

TABLE 3

| Fluid | PPG | Rate BPM | Avg. PSI | Fracture Length (ft.) | prpL | Total frac height | Total prop. height | Perf width | HHP |
|---|---|---|---|---|---|---|---|---|---|
| Guar | 1-5 | 60 | 12,907 | 180.4 | 161.8 | 295.6 | 265.3 | 0.728 | 18,980 |
| MF 40 | 1-5 | 60 | 13,317 | 151.1 | 137.4 | 310.7 | 282.6 | 0.895 | 19,584 |
| DF 40 | 1-5 | 60 | 12,790 | 162.3 | 146.5 | 310.7 | 280.6 | 0.798 | 18,808 |
| New fluid | 1-5 | 60 | 10,853 | 184.2 | 161.6 | 294.0 | 257.9 | 0.720 | 15,960 |

In the above tables, the following abbreviations are used:
prpL=propped Frac Length (in feet)
ttl Frac Ht=Total Frac Height (in feet)
ttl prpHt=Total Propped Frac Height (in feet)
Perf W=Perforation width (in feet)
HHP=Hydraulic Horsepower
DF=DynaFrac® delayed borate crosslinked fluid and additives [WEATHERFORD TECHNOLOGY HOLDINGS, LLC 2000, ST. JAMES PL., HOUSTON, TEXAS 77056] (GuarHPG/borate crosslink)
MF=a CMHPG/zirconium crosslinked fluid
Guar=Standard linear fluid, e.g. AquaVis® water-soluble polymers [HERCULES LLC, 500 HERCULES ROAD, WILMINGTON, DELAWARE 19808]

FIGS. 7A-7D are graphical representations from simulations of surface pressure, net pressure, wellbore friction, fracture length, fracture upper height, fracture lower height, and the maximum width of fracture at wellbore versus time for various convention fracturing fluids and the new fluid of the present disclosure.

Current numerical simulations for particle settling analysis are based on coupled Computational Fluid Dynamics (CFD) and Discrete Element Methods (DEMs). CFD is a branch of fluid mechanics using algorithms as well as numerical analysis to analyze (or solve) fluid flow inquiries or problems. CFD is a computer-based mechanism for making calculations to simulate interactions involving liquids, gases, surfaces, and boundary conditions. DEM belongs to a well-known family of numerical methods used to compute particle motion and interaction. These models may be used to better design and calibrate against particle settling experiments. In many embodiments, coupled CFD and DEM analysis may be used to understand and evaluate the proppant carrying capacity of a certain fluid. For example, coupled CFD and DEMs may be used in some embodiments for optimizing the parameters affecting proppant settling properties such as, for example, proppant size, proppant density, and proppant concentration (in the fluid). However, it should be appreciated that the method may be generalized to any proppant and any fluid to optimize the parameters that affect proppant settling.

The workflow may start with a candidate ranking and selection module to ensure that correct wells and/or stages are ranked and chosen for hydraulic fracturing. This module may contain input data collection and quick-look analysis to compare and contrast fracture potential between multiple well(s) or well stage(s). The input data may be collected from multiple sources, including core samples, log data and field data. The collected data and/or attributes may include reservoir characteristics (e.g., depth, pore pressure gradient, porosity, permeability, TOC, water saturation) and the geo-mechanical properties of the play (e.g., Young's modulus, Poisson's ratio, rock strength, cohesion and sh-min gradient (minimum horizontal in-situ stress)), which may be ranked and integrated to predict the fracture potential.

Once the most viable candidate wells and/or stages are chosen, experiments and/or numerical analysis may be conducted to quantify and assess the proppant-carrying capacity of the elastic fluid using the fluid and proppant design module. The available experimental and/or field test results may also be utilized to calibrate the numerical small-scale engine (e.g., CFD & DEM) for any future analysis, which may result in cost savings. With the aid of the numerical model, or by actual experiments and/or field tests, the fluid properties (viscosity, density, and proppant carrying capacity), proppant type and concentration may be modified and/or re-designed in order to achieve higher proppant carrying capacity, lower proppant settling, and appropriate stability of the fluid based on the specific reservoir and injection conditions. This process may be repeated until an optimized fluid and proppant design is obtained, which may be further analyzed in the fracture design module using an advanced geo-mechanical and production model.

The fracture design module may first simulate proppant transport using the fluid and proppant properties exported from the previous analysis and may quantify proppant coverage and distribution using an advanced geo-mechanical model. The geo-mechanical analysis may model hydraulic fracture propagation, fracture height growth, natural fracture reactivation, and proppant transport within both hydraulic fractures and reactivated natural fracture networks. The geo-mechanical model may also simulate proppant mechanical deformation (both embedment and crush) and the resulting fracture closure behavior during production to quantify conductivity reservoir volume for production analysis. The relevant mechanical properties and behavior of the chosen proppant type are preferably calibrated through related experimental work and implemented into the numerical models.

The integrated workflow includes production prediction to evaluate any proposed or existing design for a specific formation. If the predicted production falls below the target value or an economically viable level, the analysis module may adjust the engineering design parameters and/or controls such as fluid property, proppant type, injection rate, pumping schedule, etc. (which, in an embodiment, includes an emphasis on the elastic fluid properties used in the present disclosure) and iteratively rerun the fluid and proppant design module and the fracture design module until obtaining an improved and/or optimized design. Once an acceptably optimized engineering design is obtained, the analysis module may output design parameters for use in customizing the fluid properties of the present disclosure and to guide the field operations so as to maximize production.

A fluid according to the present disclosure may allow proppant to be placed into fractures more efficiently than conventional fracturing with low-viscosity properties. This provides higher proppant carrying capacity within the fracture system (main hydraulic fracture and activated natural fractures). In addition, it minimizes the pumping horsepower requirement by minimizing the fluid viscosity. Moreover, lower fluid viscosity results in less wellbore damage and reduced residual polymer within the formation by increasing the regain permeability (e.g., increasing more than 95% when compared at equal loading concentrations).

The fluid system of the present disclosure may not depend upon inherent viscosity to suspend and transport proppant. In one embodiment, a fluid that utilizes a three-dimensional proppant-suspending mechanism in a relatively low-viscosity environment may be made using polyacrylamide polymers that are functionalized via synthesis using a free-radical micellar polymerization method with low amounts of anionic long-chain alkyl, sodium 9- (and 10-) acrylamidostearate with AMPS, sodium dodecyl sulfate, vinyl pyrrolidone, hydroxyethyl acrylate and/or ionizable carboxylic groups depending upon the desired final fluid rheological properties and brine compatibilities. For some versions of the fluid, minor amounts of other mono-functional or poly-functional monomers including styrene, vinyl toluene, butyl acrylate, methyl methacrylate, vinylidene chloride, vinyl acetate and the like may also be added to the backbone of the main polymer once the water solubility of the polymer is assured.

In addition, the fluid parameters used to test the present disclosure may be optimized using an integrated geo-mechanical-fluid flow workflow. Multiple scales of both analytical and numerical models may be set up and utilized in the workflow to assess the proppant carrying capacity of the fluid of the present disclosure and ensure the success of utilizing the fluid of the present disclosure. The fluid of the present disclosure design methodology may be customized and flexible based on available experimental data, reservoir condition, proppant type and user-specific requirements to enhance the proppant carrying capacity while lowering the required pumping horsepower for injection. The fluid design may be coupled with reservoir-scale fracture simulations. By comparing different design plans, the proppant settling, embedment and crush may be minimized so as to enhance the proppant coverage and conductive reservoir volume within the framework of the workflow. In such a way, the engineering parameters, including fluid properties, proppant type and pumping schedule, may be iteratively optimized to enhance the proppant-carrying efficiency and hence the overall production. The ultimate decision on the fluid design strategy for a successful hydraulic fracture treatment should be assessed within the local geological condition by using the integrated workflow for thorough evaluation. Thus, the engineered fluid design and pumping schedule may be customized based on data unique to different formations.

An exemplary viscosifying agent according to one embodiment of the present disclosure is a product that comprises a copolymer that has been polymerized using two separate monomers—the first being an acrylic acid monomer and the second comprising a monomer selected from:

a) about 20% to about 80% by weight of at least one carboxylic acid monomer comprising acrylic acid, methacrylic acid, itaconic acid, fumaric acid, crotonic acid, aconitic acid, or maleic acid, or combinations thereof;

b) about 80% to about 15% by weight of at least one $C_1$ to $C_5$ alkyl ester and/or at least one $C_1$ to $C_5$ hydroxy-alkyl ester of acrylic acid or methacrylic acid;

c) about 0.01% to about 5% by weight of at least one crosslinking monomer; and optionally d) about 1% to about 35% by weight of at least one α,β-ethylenically unsaturated monomer selected from:

$CH_2\!\!=\!\!C(R)C(O)OR^1$ wherein R is selected from hydrogen or methyl; and $R^1$ is selected from $C_6$-$C_{10}$ alkyl, $C_6$ to $C_{10}$ hydroxyalkyl, —$(CH_2)_2OCH_2CH_3$, and —$(CH_2)_2C(O)OH$ and salts thereof.

$CH_2\!\!=\!\!C(R)X$ wherein R is hydrogen or methyl; and X is selected from —$C_6H_5$, —CN, —$C(O)NH_2$, —$NC_4H_6O$, —$C(O)NHC(CH_3)_3$, —$C(O)N(CH_3)_2$, —$C(O)NHC(CH_3MCH_2)_4CH_3$, and $C(O)NHC(CH_3)_2CH_2S(O)(O)OH$ and salts thereof.

$CH_2\!\!=\!\!CHOC(O)R^1$ wherein $R^1$ is linear or branched $C_1$-$C_{18}$ alkyl; and $CH_2\!\!=\!\!C(R)C(O)OAOR^2$ wherein A is a divalent radical selected from —$CH_2CH(OH)CH_2$—, and —$CH_2CH(CH_2OH)$—, R is selected from hydrogen or methyl, and $R^2$ is an acyl residue of a linear or branched, saturated or unsaturated $C_{10}$ to $C_{22}$ fatty acid.

The polymerization may be a random polymerization—i.e., although on a weight basis there is a certain, selected amount of each monomer, the order in which the monomers are arranged in the polymer backbone is not definite.

In the copolymer, the predominant monomer in the polymer may preferably be acrylic acid, with relatively little of the secondary monomer in the polymer. The overall MW of the copolymer may be very high, approximately 1,000,000,000 Daltons.

Of course, many variations may be substituted to obtain a similar effect by those skilled in the art. Moreover, other fluids may be used, such as an elastic fluid as disclosed herein can be a fluid capable of suspending proppant materials without requiring high pumping horsepower. Overall, the elastic fluid as disclosed herein may not follow a single rheology model, such as the Power Law model used for most fracturing fluids. Instead, the elastic fluid may follow a hybrid rheology model as disclosed herein.

An elastic fluid as defined according to the present disclosure can encompass elastic fluid behavior ranging from natural polymers to synthetics. The defined elastic fluid can include elastic fluid agents, such as copolymers polymerized from acrylic acid monomers, characterized by a hybrid rheology behavior that deviates from the typical Power Law model. In exemplary embodiments, a subject elastic fluid may be configured to carry proppant ranging from silica white, resin coated, curable, and ceramic proppants at concentrations ranging from 0.1 lb/gl-10 lbs/gl. The subject elastic fluids can encompass a viscosity of 20 cP-90 cP at ambient temperature at 511 1/s with R1:131 bob configuration and equivalent viscosity with R1:135 and R1:B2 configurations.

Further details of the fluid disclosed above can be found in copending PCT Appl. No. PCT/US18/43295, filed 23 Jul. 2018 and entitled "FRACTURING METHOD USING A LOW-VISCOSITY FLUID WITH LOW PROPPANT SETTLING RATE," which is incorporated herein by reference in its entirety.

Having an understanding of fluids of interest according to the present disclosure, discussion now turns to how to model and use such elastic fluids for hydraulic fracturing operations.

Figure 8:
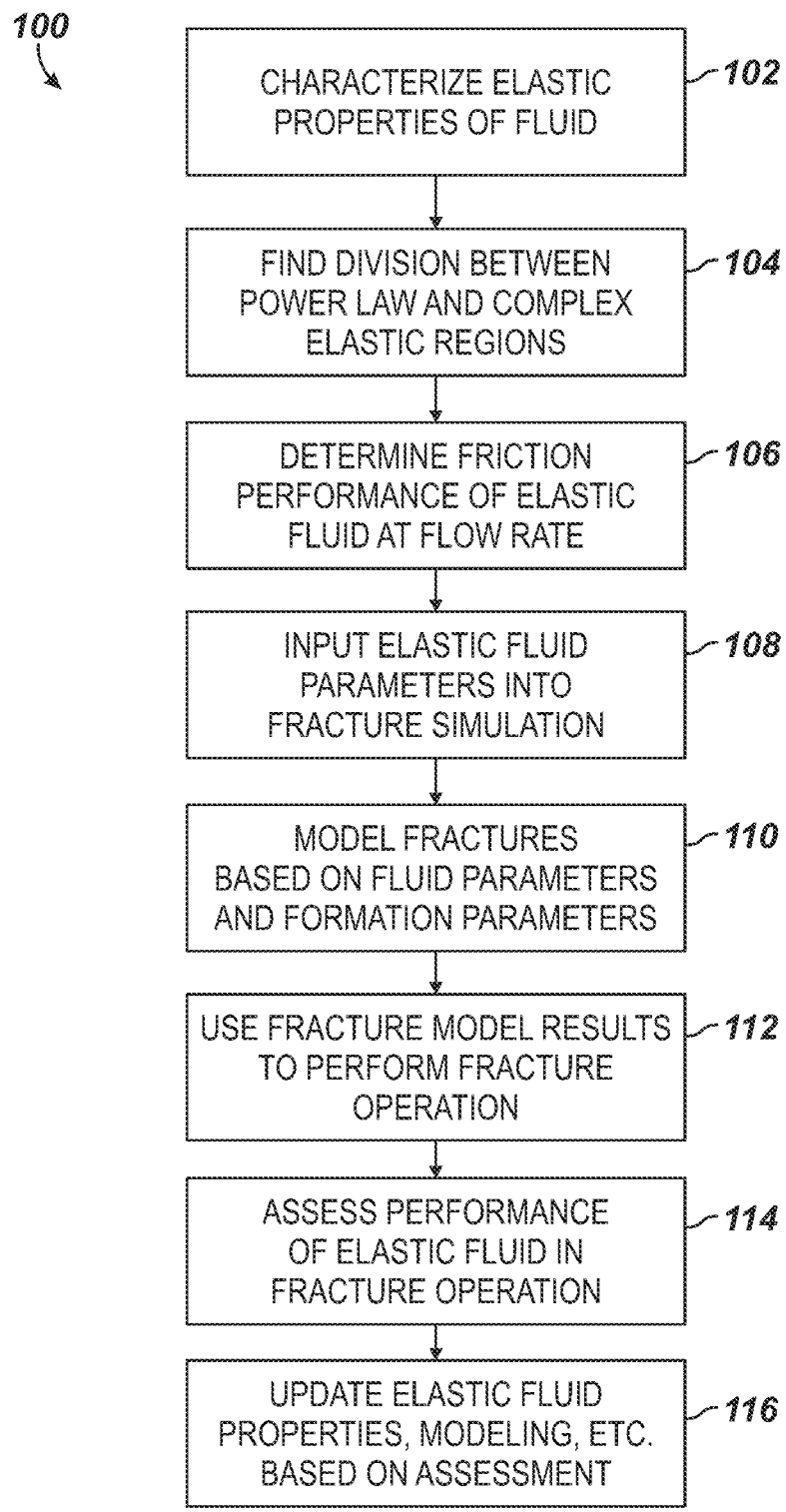
FIG. 8 is a flow chart of a process for performing a hydraulic fracturing operation with elastic fluid implementing a physics-based analytical tool according to the present disclosure.

FIG. 8 is a flow chart of a process 100 for performing a hydraulic fracturing operation with an elastic fluid using a physics-based analytical tool according to the present disclosure. In the process 100, elastic properties of a subject fluid are characterized (Block 102). To model a more complete physics behavior of the subject elastic fluid, such as a fluid disclosed herein, the process combines information about elastic properties and results of friction experiments of the subject fluid. In this way, parameters of the elastic fluid required for later use in modeling are based on both experimental tests and analytical tools.

Based on the characterization, for example, a division is found in the properties of the subject fluid between a region where the Power Law characterizes the fluid properties and a complex region for the subject fluid governed by elastic properties (Block 104). Details are provided below with reference to FIGS. 9A-9B.

Moreover, using the understanding of the elastic fluid and its properties, friction performance of subject fluid is determined at flow rates (Block 106). Details are provided below with reference to FIGS. 11, 12A-12B, and 13.

Having an understanding of the elastic fluid, its properties, and friction performance, the elastic fluid parameters are input into a fracture simulation algorithm of an analytical tool (Block 108). The algorithm models simulated fractures that can be induced in a hydraulic fracturing operation in a subject formation based on the fluid parameters, formation parameters, and details of completion (Block 110).

In the modeling, the corrected friction behavior of the subject elastic fluid from the previous steps is used to calibrate a hydraulic fracture model of interest. Once the hydraulic fracture model is calibrated, the hydraulic fracture model can simulate more realistic fracture geometries in a formation based on the inputs.

Changes to the modelling can be performed with additional simulations, and results of the fracture model can be used to plan and ultimately perform a fracture operation of subject formation (Block 112). Performance of the elastic fluid in the fracture operation can be then assessed (Block 114), and the assessment can be used to update and refine the elastic fluid properties, friction performance, the modelling, and the like to be used when performing additional operations (Block 116). For example, the integrated analytical tool and process can utilize field data from a post fracturing job. This can specifically include the collection of friction data at different rates and flow path IDs (i.e., pipe restrictions and the like) in the completion to improve the model's predictions for future analysis.

To do the analysis, calibration, and modeling in the process 100 of FIG. 8, new physics and fluid technology according to the teachings of the present disclosure are developed based on a subject elastic fluid. As disclosed herein, the subject elastic fluid has a polymer engineered to form a network of packed structures from polymer associations providing the maximum proppant suspension. The new integrated approach breaks from the traditional reliance on viscosity to enhance proppant transport during treatments. In the end, this enhanced method can enhance fracture conductivity, can improve proppant placement, and can achieve distribution without settling, providing better connectivity with the reservoir and its complexities as well as leading to a major reduction in maintenance costs associated with existing injection pressures, as the current industry trend is unsustainable.

In particular, the new integrated approach includes a hybrid rheology analytical model that correlates the elastic fluid's rheology parameters—firstly correlating n' and k' values, and secondly correlating the storage and loss moduli profile (G' and G" accordingly) of the subject fluid. The complex fluid behavior deviates from common rheology models, as evidenced by the elastic properties, such as storage modulus (G'), loss modulus (G"), and angular frequency (rad-sec), in the context of the unique fluid characteristics of a network of packed structures from polymer associations. Physics-based model results from a 3D fracture simulator computes the viscosity and elastic parameters based on shear rate to calculate the pressure losses along the flow path from surface lines, tubular goods, perforations, and fractures, optimizing horse power requirements based on reduced pressure loses.

The accompanying Figures demonstrate that the physics and the unique fluid behavior are achieved using an elastic fluid and a network of packed structures from polymer associations, having proper proppant suspension, effectively placed at low viscosity, low injection pressures, with no settling, and high retained conductivities.

A parameter of interest in a hydraulic fracturing model is the rheology model of the fracturing fluid. Conventional fracturing fluids follow the Power Law rheology model based on viscosity. This Power Law rheology model may only represent a short segment of the rheology behavior for the subject elastic fluid, as compared to viscous fluids.

For instance, FIG. 9A illustrates a graph 150 of a rheology test performed on a complex elastic fluid and a viscous fluid. (As will be appreciated, the testing can be performed on a fluid under investigation using viscometers, rheometers, consistometers, and other equipment available in the art to measure rheological properties (viscosity, elasticity, and consistency) and other properties, which can be non-linear as functions of time, temperature, and pressure.)

As shown, a hybrid rheology behavior 154 of the complex elastic fluid is graphed comparatively to conventional behavior 152 of a viscous fluid (e.g., guar) in terms of Shear Rate (ranging from 0.01 to 1000 (1/sec)) versus Viscosity (cP). During a typical hydraulic fracturing job, the shear rates depend on (i) the pumping rate (velocity) of the fracturing fluid and (ii) the different pipe geometries (flow path) through which the fracturing fluid will flow. A shear rate profile may range from 1300 (1/sec) to as low as 5 (1/sec) inside fractures, which will depend on the fracture geometry per se.

The test shows a point or threshold 156 at which the elastic fluid's behavior 154 deviates from the Power Law model and becomes G', G" dependent as the elastic fluid experiences an increase in the storage modulus (G'>G"). In particular, the viscous fluid's behavior 152 can be seen to follow the Power Law model at higher shear rates and simply continues following a constant viscosity trend dictated by the Power Law model at lower shear rates. The elastic fluid's behavior 154 also follows the Power Law model at higher shear rates. However, at the lower shear rates, the elastic fluid's behavior 154 deviates from the Power Law behavior as shear rates decreases beyond a certain point or threshold 156 from high to low shear rates.

Even though the Power Law can be used to characterize the rheological behaviors 152, 154 in a higher shear rate window 158P for both the subject elastic fluid and the comparative viscous fluid, a complex region 158E for the rheological behavior 154 for the elastic fluid is dependent on elasticity properties, such as storage modulus G' and loss modulus G". At a point 156 in the modeling, the subject elastic fluid's behavior 154 deviates from the Power Law model and becomes more G', G" dependent (storage module increases G'>G"). As noted previously, current rheology models for fracturing fluid cannot capture this physics so that the current models fail to accurately calculate pressure losses while pumping a fracturing job.

According to the present disclosure, a hybrid-rheology analytical model for elastic fluids divides the flow behavior 154 into two sets of rheology parameters or regions: firstly, a first region 158P of the model uses n' and k' values, and secondly, a second region 158E of the model uses the storage and loss moduli profile (G' and G" accordingly).

In particular, most fracturing fluids follow the Power Law rheological model defined by the Ostwald de Waele Equation $T=K'*\gamma'^n$ based on shear stress (T) shear rate ($\gamma$). The parameter K' is the consistency index, and n' is the power law exponent or non-Newtonian index. Shear-thinning fluids are characterized by a value of n' between zero and unity (0<n'<1). Many polymer blends exhibit the value of n' in the range 0.3-0.7 depending on the concentration and molecular weight of the polymer used.

The hybrid rheology analytical tool uses a mathematical model considering these n' and k' values to identify the threshold 156 (limit, range, or window) of shear rates for which the Power Law model is applicable. Below that threshold 156, the complex rheology behavior 154 of the subject elastic fluid deviates from the Power Law model, and this complex rheology behavior 154 is modeled based on the storage modulus (G' in Pa), loss modulus (G" in Pa), and angular frequency (rad-sec). Further details will be discussed with reference to FIG. 9B.

In the process steps 120, 104 of FIG. 8 to characterize the elastic properties of the subject elastic fluid and determine the division between Power Law and elastic regions, a determination is made how the Power Law applies to the fluid flow behavior of the elastic fluid. The threshold 156 (limit, range, or window) of shear rates for which the Power Law model is applicable is determined based on several combinations of differential equations, including a differential equation of viscosity with respect to shear rate:

$$\frac{\delta \mu}{\delta \gamma};$$

a differential equation or power law flow index with respect to shear rate:

$$\frac{\delta n'}{\delta \gamma};$$

and a differential equation of G' with respect to shear rate:

$$\frac{\delta G'}{\delta \gamma}.$$

The current hydraulic fracturing models can only use simple rheological models to compute the viscosity behavior of a fracturing fluid. Therefore, the pressure drop throughout the flow path (i.e., surface lines, tubular goods, perforations, and hydraulic fractures) is based on the simple models. As the fluid travels through different geometries, it experiences deformation at different shear rates from high to low magnitudes, affecting its apparent viscosity. This process can be easily predicted for common Guar, HPG, or HEC based linear gels in most hydraulic fracturing simulation tools. However, this approach becomes obsolete when modeling more complex fracturing fluids where the elasticity property may be a difficult parameter to replicate.

As seen in the graph 150 of FIG. 9A, viscous and elastic fluids may exhibit similar Power Law properties, such as k' and n'. However, their apparent viscosities can be quite different at certain shear rates. In fact, a fracturing fluid, such as the elastic fluid disclosed herein, is a complex fluids that exhibits viscoelastic behavior in terms of viscosity changes, and elastic deformation when flowing at certain conditions. To understand these complex flow conditions, the following equations are used:

A first equation for characterizing the complex flow conditions is shear strain $$\gamma = \frac{s}{h},$$

where s is the horizontal displacement, and h is vertical distance between a two-plate model representation; and A second equation for characterizing the complex flow conditions is shear modulus $G=\tau/\gamma$, where $\tau$ represents the shear stress (Pa), and $\gamma$ is the shear strain from previous equation.

The elasticity law is defined by a complex shear modulus G*, which is a ratio between shear-stress amplitude ($\tau_a$) and strain amplitude ($\gamma_a$). The complex shear modulus G* is based on oscillatory shear experiments that can be used to find a more accurate rheology representation of the elastic behavior in complex fracturing fluids. The complex shear modulus G* is a resultant vector that consists of two components: (i) G' for an elasticity component that is the storage modulus on the X axis, and (ii) G" for a viscosity component on the Y axis that represents the viscous behavior of the complex fluid, as illustrated by a representation 170 in FIG. 10. In particular, FIG. 10 illustrates the representation 170 of an elasticity law defined by a complex shear modulus G*, which is the ratio between shear-stress amplitude (ta) and the strain amplitude ($\gamma$a). The representation is based on oscillatory shear experiments used to find a more accurate rheology representation of the elastic behavior in complex fracturing fluids. The elastic fracturing fluid can have weak and elongated links as molecular links are stretched. The elastic fluid can store the deformation stress, and can experience a reversible recovery process when the applied energy is removed, which means that the storage modulus is greater than the loss modulus (G'>G").

What defines a complex fracturing fluid with elastic characteristics is the relation between the storage modulus G' (referring to the elastic behavior) and the loss modulus G" (describing the viscous behavior of polymeric fluids). These fluids exhibit a friction or pressure loss as they flow through different geometries as a result of molecules interaction and pipe wall roughness characteristics. On the other hand, if the fluid has an elastic property, it will behave as a flexible material capable of withstanding deformations with negligible effect on its structure. The typical case occurs when the fluids experience abrupt changes in shear rate that can cause dynamic viscosity changes without damaging its molecular structure. In other words, due to the elasticity property the fluid may recover from the applied deformation, once the shear stress is removed, and the temporary strain observed will disappear.

As further shown in a graph 160 of FIG. 9B, an oscillation test illustrates storage modulus G' and loss modulus G" for an elastic fluid and a viscous fluid. The amplitude of the storage modulus (G') determines the degree of elasticity of the fluid. The elastic fluid's storage modulus G' curve 162a exhibits a higher amplitude over its loss modulus G" curve 162b. This contrasts with the amplitude of the viscous fluid's curve loss modulus G" curve 164b, which is greater than its storage modulus G' curve 164a.

With the threshold 156 calculated between regions 158P-158E in FIG. 9A and the degree of elasticity of the subject fluid characterized as in FIG. 9B, friction performance of the elastic fluid can be performed, such as outlined in the step 106 of the process 100 in FIG. 8. Here, friction performance of the elastic fluid combines two determinations of different friction segments—a first segment for the elastic fluid's behavior 154 in the Power Law (viscous) region 158P, and a second segment for the elastic fluid's behavior 154 in the complex storage modulus (G') and loss modulus (G") (elastic) region 158E, such as previously characterized with respect to FIG. 9A.

For instance, FIG. 11 illustrates a graph 180 of a friction loop test that tests sensitivity of the subject elastic fluid conducted at a several steps (pumping or flow rates). (As will be appreciated, the testing can be performed using a friction flow loop instrument and other equipment available in the art to circulate a subject fluid through multiple tube sections of varying diameters to measure flow rate relative to differential pressure for the various diameters.)

In this example, friction loop testing for a diameter of ½" graphs Reynolds number ($N_{Re}$) over time at two flow rate steps: step 1—flow rate Q of about 4.9 gpm, and step 2—flow rate Q of about 10.3 gpm. The test captures different friction reduction behaviors 184 at the specific Reynolds numbers ($N_{Re}$) 182—i.e., at specific turbulent regimes. This data and additional testing data is used to build a hybrid analytical model to estimate a friction performance of the elastic fluid in the complex flow region (i.e., 158E of FIG. 9A).

Based on the analysis such as in FIG. 11, the analysis computes pressure losses calibrated with friction flow loop experimental data (Reynolds number) at different shear rate data points (i.e., stations of different flow rates, flow restrictions, etc.) to capture real friction reduction of the subject elastic fluid considering an isothermal process. The model may require different friction stepwise data points (e.g., stations of different flow rates, flow restrictions, etc.) to increase the accuracy of the friction estimation or pressure match. The data is processed in the hydraulics module to find the best curve fit combination according to Reynolds number and shear rate for each station for the complex elastic region dominated by greater storage modulus (G').

Additional friction performance assessments of the subject fluid are shown in FIGS. 12A-12B. In particular, FIG. 12A illustrates a graph 190A of a friction performance assessment estimating friction (psi/1000 ft) at different pumping/flow rates based on a first pipe size of internal diameter ID of 3.826-in. FIG. 12B illustrates a graph 190B of another friction performance assessment estimating friction (psi/1000 ft) at different pumping/flow rates based on a second pipe size of internal diameter ID of 2.992-in. The curves 192 represent the friction of the elastic fluid. The elastic fluid's friction is very low as compared to the curves 194, 196, and 198 for viscous fluids (such as guar), which are graphed at different polymer loadings.

These friction performance assessments, such as in FIGS. 12A-12B, are constructed by combining three sets of information of the subject elastic fluid. First information of the hybrid rheology of the subject elastic fluid (the elastic fluid's behavior 154 as modelled in FIG. 9A) is combined with second information and third information to produce a friction performance of the fluids. The second information includes the modeling of G', G" relative to angular frequency (rad/sec) as modelled in FIG. 9B. The third information includes the modeling of $N_{Re}$ and % Friction Reduction at flow rates as modelled in FIG. 11. Combined together, the first, second, and third information produces a friction performance, which is graphed in terms of Friction Gradient (psi/1000-ft) versus flow rate (gpm) for fluids in FIGS. 12A-12B. Here, a subject elastic fluid (curve 192) is compared to different conventional fluids (curves 194, 196, 198), such a second fluid having 25 ppt (pounds per thousand gallons) of guar, a third fluid having 30-ppt of guar, and a fourth fluid DynaFrac fluid 40 #.

As noted above in the process 100 of FIG. 8, the corrected friction behavior of the subject elastic fluid from these previous steps (Block 102, 104, 106) is used to calibrate a hydraulic fracture model of interest so the calibrated hydraulic fracture model can simulate more realistic fracture geometries.

For instance, FIG. 13 illustrates a graph 200 representing friction calibration for the analytical model. The friction performance of the fluids (as modelled in FIG. 12A-12B) calibrates an analytical estimation of the fluids. As shown here, the pipe friction losses (psi/1000 ft) for a pipe ID of 2.992" is calibrated with friction loop testing. Friction loss (Wb Fric) is graphed relative to pumping rate (bpm) for several fracturing fluids, including slickwater 0.5 WFR (psi/1000 ft), 40 #linear Gel, 20 #linear Gel, and a 25 #elastic fluid as disclosed herein.

As noted above in steps 102, 104, and 106 of the process 100 in FIG. 8, the understanding of the elastic fluid, its properties, and friction performance as determined above are input into a fracture simulation algorithm of an analytical tool to simulated fractures in a hydraulic fracturing operation (Block 108). The parameters input into the simulation algorithm include an understanding of the friction loss of the subject elastic fluid relative to pumping rates that takes into account the hybrid rheology model of the elastic fluid. This understanding enables the simulation algorithm to better model and simulate hydraulic fracturing in a reservoir of interest.

For example, FIGS. 14A-14B and 15A-15B illustrate design review and testing results of a fracture aperture comparison with the analytical model discussed above. Fracture simulation software (e.g., WFracSim from Weatherford International) simulates fractures based on inputs for reservoir properties and fluid/proppant properties. Based on the analytical model discussed above, the simulation software models geometries of fractures produced. Here, software displays 300 show geometries simulated for two fluids, a conventional fluid and a subject elastic fluid.

Figure 14A:
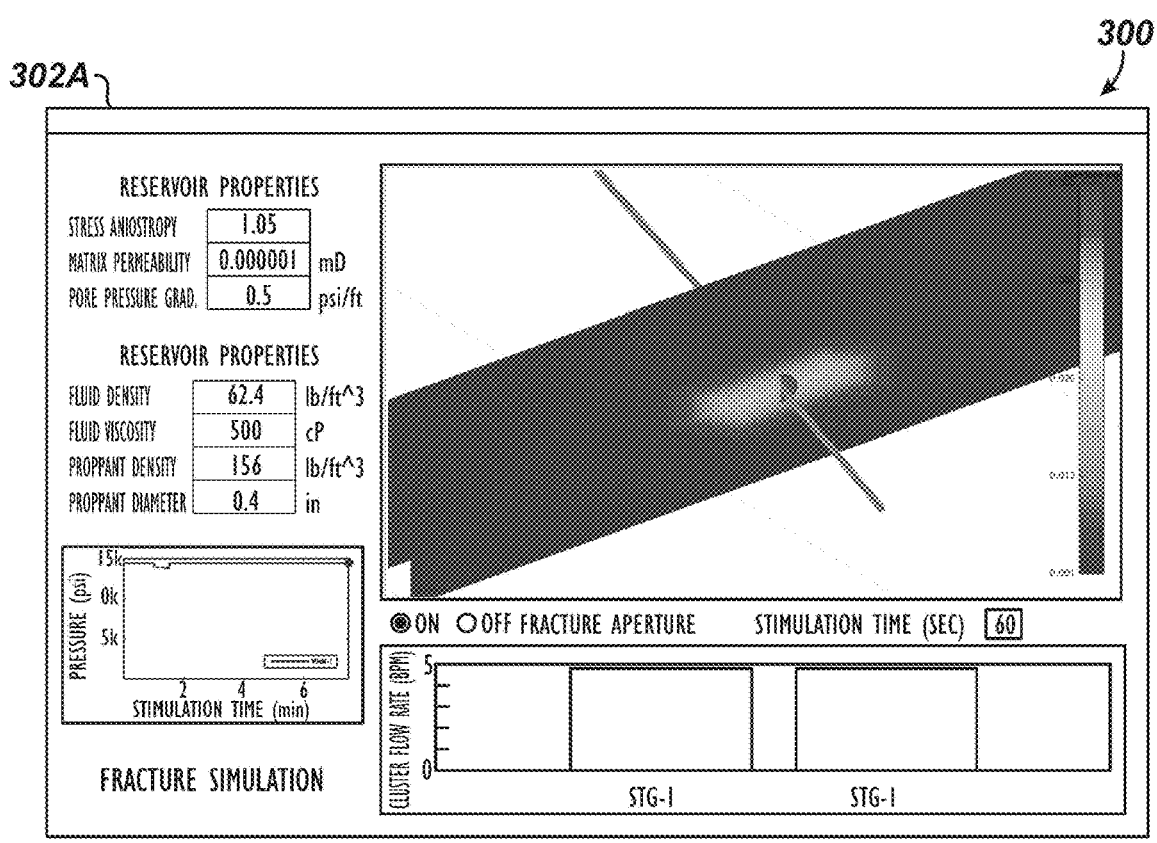
Figure 14B:
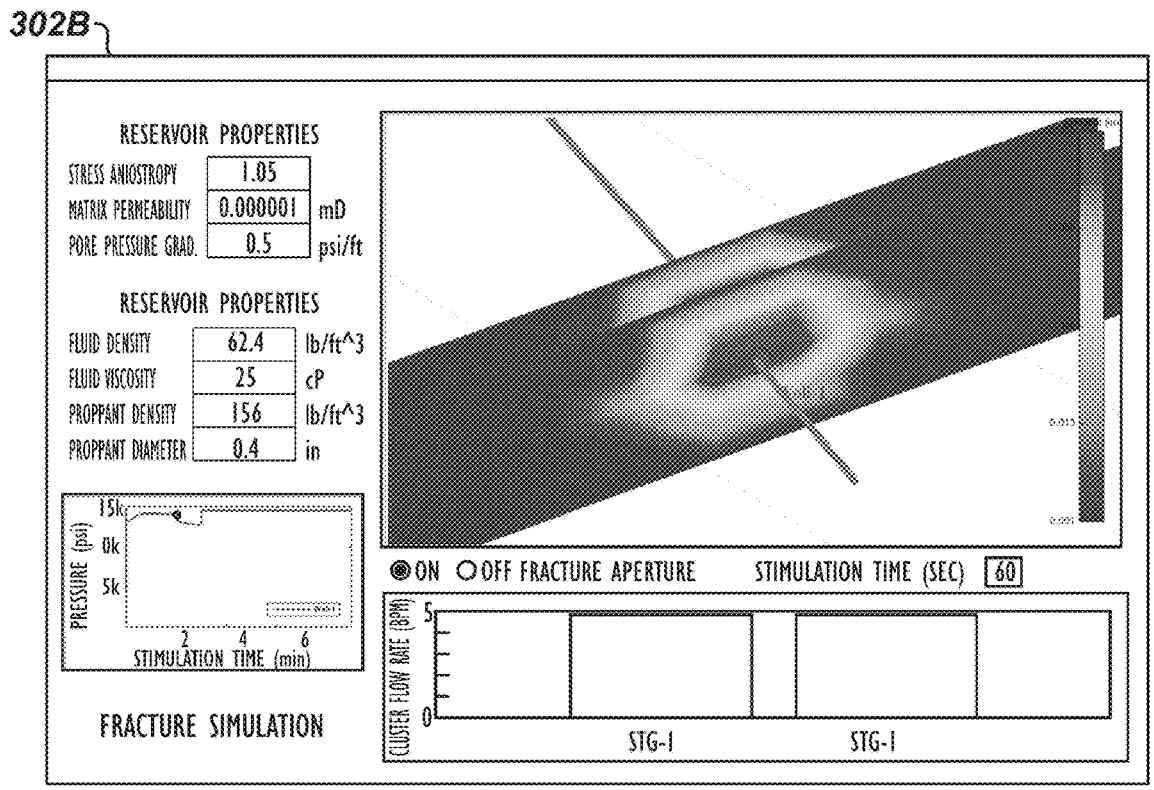
Figure 15A:
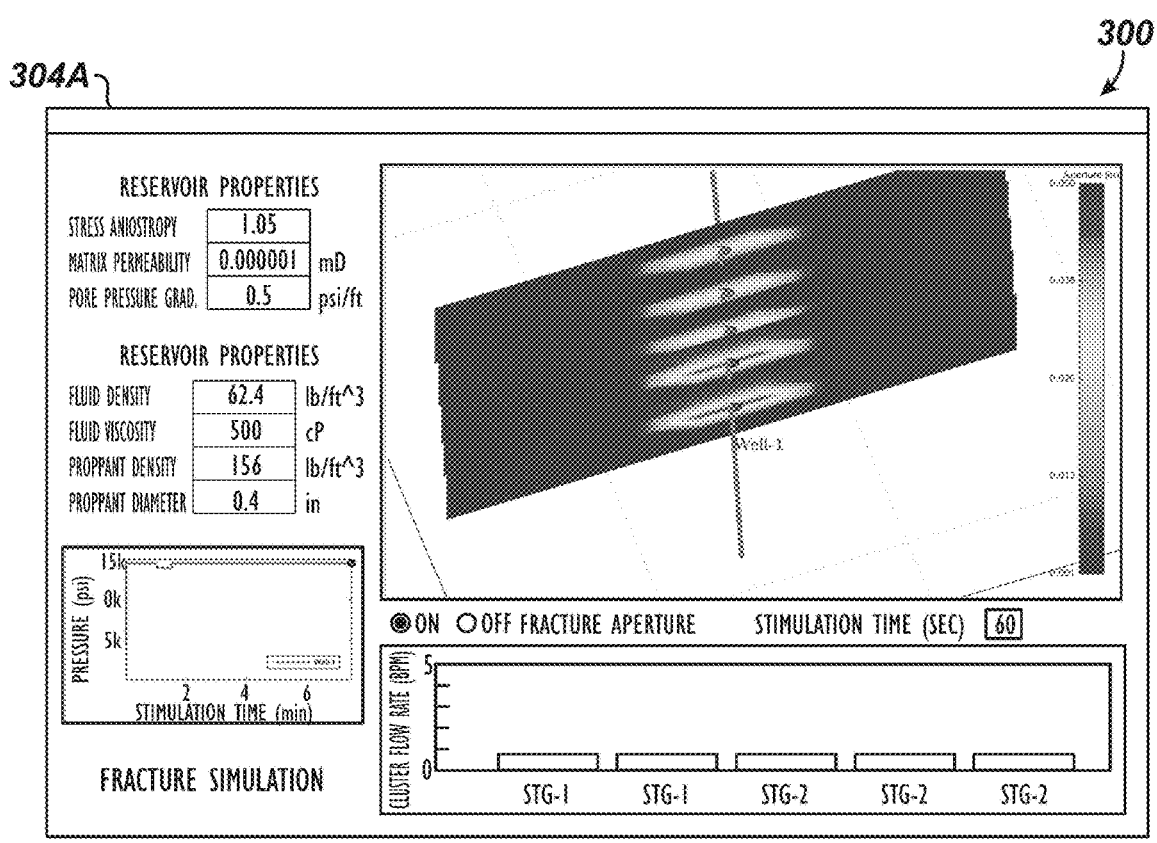
Figure 15B:
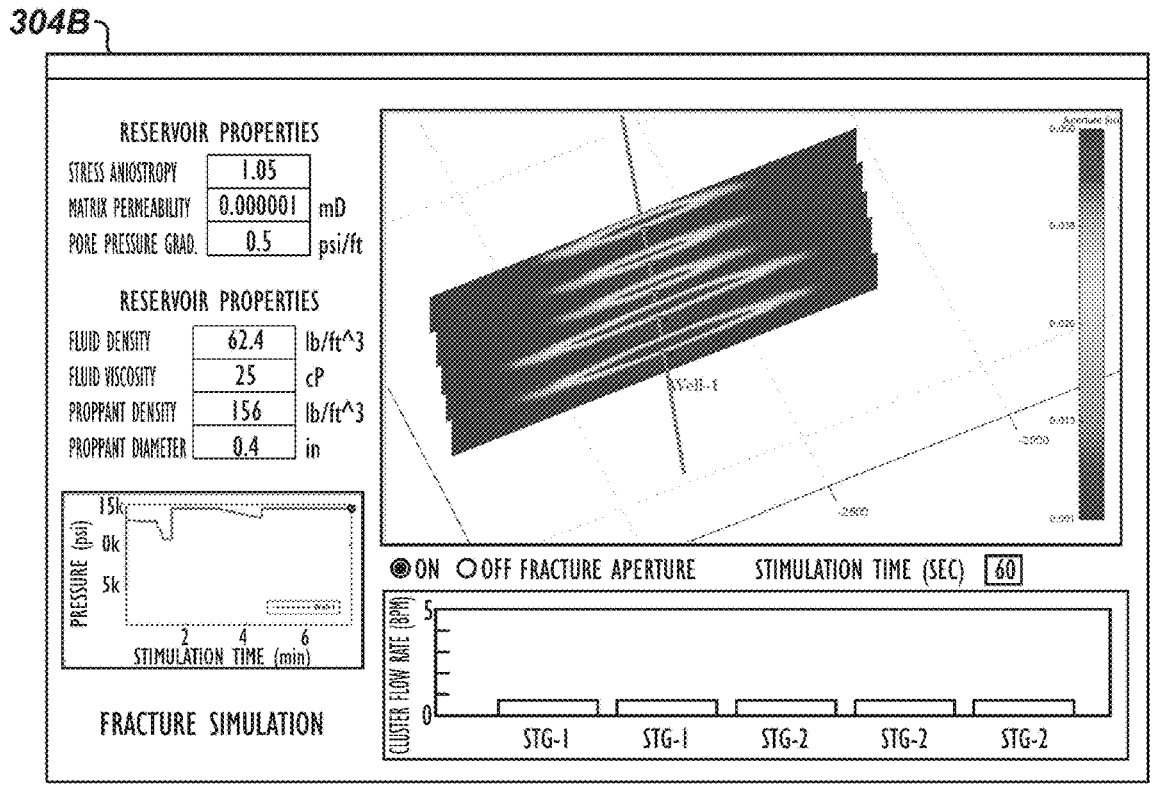

For instance, the fracture geometry modelled for the conventional fluid (e.g., viscosity of 500 cP) are simulated in two example displays 302A, 304A of FIGS. 14A and 15A. These are shown in comparison to the fracture geometry modeled for the subject elastic fluid (e.g., viscosity of 25 cP), which are simulated in two example displays 302B, 304B of FIGS. 14B and 15B. The reservoir properties, such as stress anisotropy, matrix permeability, and pore pressure gradient, are input into the simulation software. Likewise, fluid/proppant properties, such as fluid density, fluid viscosity, proppant density, and proppant diameter, are input into the simulation software. Moreover, details of the fracture aperture and stimulation time are input into the simulation software. The various values of these parameters are the same for both fluids in the comparison, except for the viscosity and the underlying fluid properties as modelled according to the present disclosure.

Using the input and modelling algorithms, the modelled fracture geometries are then predicted by the software for the conventional fluid and the elastic fluid. Due to the understanding of the underlying fluid properties of the elastic fluid as modelled according to the present disclosure, the simulation can produce more accurate fracture geometries for this particular type of elastic fluid, which has not been possible under previous modeling regimes available in the art.

FIG. 16 illustrates a fracturing system 400 having an integrated physics-based tool 412 according to the present disclosure. A processing unit 410, such as computer or other suitable device, has a database 420 and a control interface 430. The database 420 stores relevant information on fluid properties, formation characteristics, etc. The integrated physics-based tool 412 operates on the processing unit 410 and can access a number of software algorithms or models 422, 424, 426.

The hydraulics model 422 can model/simulate hydraulic fracturing in a formation based on inputs. The rheology models 424 can model/characterize fracturing fluids and their properties. The numerical models 426 can include Computational Fluid Dynamics (CFD) and Discrete Element Methods (DEMs).

Using the models 422, 424, 426, the tool 412 defines a complex fluid flow behavior of an elastic fluid in terms of friction performance according to the teachings disclosed herein in a formation of interest. The tool 212 can rank candidate wells or well sections in the formation of interest based a consideration of one or more factors selected from the group consisting of reservoir depth, pore pressure gradient, porosity, permeability, TOC, water saturation, Young's modulus, Poisson's ratio, rock strength, cohesion and sh-min gradient.

With wells or sections selected, the tool 412 can then optimize hydraulic fracturing parameters for treating the formation based on selection of an ideal elastic fracturing fluid, a proppant type, a proppant concentration, and a pumping rate according to the desired stimulation objective.

In particular, the tool 412 uses numerical analysis in models 422, 424, 426 to quantify the proppant-carrying capacity of the elastic fluid based on experimental data on a 3D Model Suspension test that can be run up to the desired maximum concentration on steps of 1 ppg. This data is combined with elasticity and viscosity parameters to calibrate the proppant transport model with numerical simulations for particle settling analysis which are based on coupled Computational Fluid Dynamics (CFD) and Discrete Element Methods (DEMs).

The ideal elastic fluid can be defined by fluid properties, such as viscosity and density affecting the proppant transport process. A change of fluid properties and its impact on the proppant carrying capacity can be quantified or estimated by numerical analysis. For example, numerical analysis can also be performed to quantify the proppant-carrying capacity of the fracturing fluid with respect to density by considering experimental and field data. The suspension capacity can be modeled in static conditions after pumping stops and a shut-in stage begins, allowing the proppant to be suspended while fracture closure takes place. Numerical analysis can be performed to quantify the proppant-carrying capacity of the fracturing fluid with various proppant types and concentrations.

Using the user interface 414, an operator determines fracturing parameters for a fracturing operation with the subject elastic fluid, proppant, concentrations, etc. in the physics tool 412. The fracturing parameters are selected with respect to a certain geological condition using an integrated fluid-geomechanics workflow.

The fracturing parameters are determined by: performing a simulation to predict the hydraulic fracture propagation, fracture height growth and natural fracture reactivation; performing a simulation to model the proppant transport within both main hydraulic fractures and a reactivated natural fracture network; performing a simulation to assess the proppant embedment and crush and fracture surface closure behavior during production; performing a simulation to forecast the production efficiency; and choosing an effective stimulation design by a comparison of the predicted result corresponding to a typical design plan, wherein fracturing parameters of the planned stimulation operations are optimized based upon the extent of conductive reservoir volume and production efficiency. The fracturing parameters can also include information about a pumping schedule. For example, the pumping schedule can include changes in an injection time, rate, proppant type, and fluid properties.

The physics-based modeling computes viscosity and elastic parameters based on fluid mechanics parameters to calculate pressure losses along a flow path from surface lines, tubular goods, perforations, and fractures in the simulated completion. The physics-based model can determine optimized horse power requirements based on the reduced pressure losses. In this way, the modeling of the present disclosure can help optimize the pumping horsepower requirements and can improve the proppant coverage when carrying large/heavy proppant, keeping the proppant in the desired place, enhancing the conductivity of the stimulated fracture and reactivating natural fractures.

Once modelling is complete and fracturing parameters for a hydraulic fraction operation have been developed for candidate wells or well sections, the processing unit 410 can integrate the results through a control interface 430 with a fracturing system 35 at one or more rigs 30 of to conduct a hydraulic fracturing operation in one or more wells 10 or well sections. Post fracture data can then be fed back to the processing unit 410 for updating the various models 422, 424, 426.

As will be appreciated, teachings of the present disclosure can be implemented in digital electronic circuitry, computer hardware, computer firmware, computer software, programmable logic controller, or any combination thereof. Teachings of the present disclosure can be implemented in a programmable storage device (computer program product tangibly embodied in a machine-readable storage device) for execution by a programmable control device or processor (e.g., control system 400, processing unit 410, etc.) so that the programmable processor executing program instructions can perform functions of the present disclosure. The teachings of the present disclosure can be implemented advantageously in one or more computer programs that are executable on a programmable system (e.g., control system 400, processing unit 410, etc.) including at least one programmable processor coupled to receive data and instructions from, and to transmit data and instructions to, a data storage system (e.g., database 420), at least one input device, and at least one output device. Storage devices suitable for tangibly embodying computer program instructions and data include all forms of non-volatile memory, including by way of example semiconductor memory devices, such as solid-state devices, EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The foregoing presents particular embodiments of a system embodying the principles of the present disclosure. Those skilled in the art will be able to devise alternatives and variations which, even if not explicitly disclosed herein, embody those principles and are thus within the scope of the present disclosure. Although particular embodiments of the present disclosure have been shown and described, they are not intended to limit what this patent covers. One skilled in the art will understand that various changes and modifications may be made without departing from the scope of the present disclosure as literally and equivalently covered by the following claims.

What is claimed is:

1. A method implemented with a fracturing system to hydraulically fracture a completion interval in a formation, the method comprising:
    obtaining completion parameters characterizing the completion interval;
    obtaining formation parameters characterizing the formation;
    obtaining fluid parameters characterizing an elastic fluid for the hydraulic fracturing by:
        (i) defining regions of behavior for the elastic fluid relating shear rate relative to viscosity of the elastic fluid, the regions of behavior including (a) a viscous region defined by a threshold of the shear rate at which the Power Law applies to the elastic fluid and including (b) an elastic region defined by storage modulus (G') relative to loss modulus (G"), by calculating the threshold of the shear rate at which the Power Law applies to the elastic fluid based on:
            a first differential equation of the viscosity with respect to shear rate:

$$\frac{\delta \mu}{\delta \gamma},$$

a second differential equation of a flow index (n') of the Power Law with respect to shear rate:

$$\frac{\delta n\prime}{\delta \gamma},$$

and a third differential equation of the storage modulus (G') of the elastic fluid with respect to shear rate $$\frac{\delta G\prime}{\delta \gamma},$$

and
        (ii) defining, according to the regions of behavior, friction performance of the elastic fluid relating fiction gradient relative to flow rate of the elastic fluid;
    determining fracturing parameters for the hydraulic fracturing by modeling the hydraulic fracturing with the elastic fluid in the completion interval in the formation based on the formation parameters, the completion parameters, and the fluid parameters; and
    performing an operation of the hydraulic fracturing with the elastic fluid in the completion interval using the determined fracturing parameters.

2. The method of claim 1, wherein defining the regions of behavior comprises performing an oscillation test on the elastic fluid to define elastic modules.

3. The method of claim 1, wherein defining, according to the regions of behavior, the friction performance of the elastic fluid relating the fiction gradient relative to the flow rate of the elastic fluid comprises determining the friction performance in two different friction segments, a first of the friction segments for the viscous region defined by the Power Law, and a second of the friction segment for the elastic region defined by the storage modulus (G') relative to the loss modulus (G").

4. The method of claim 1, wherein defining, according to the regions of behavior, the friction performance of the elastic fluid relating the fiction gradient relative to the flow rate of the elastic fluid comprises performing friction loop testing of the elastic fluid in a plurality of pipe sizes at a plurality of different ones of the flow rates; and estimating a plurality of the friction gradient of the elastic fluid at the different flow rates for the plurality of pipe sizes.

5. The method recited in claim 1, wherein defining, according to the regions of behavior, the friction performance of the elastic fluid relating the fiction gradient relative to the flow rate of the elastic fluid comprises:
    obtaining experimental data points in terms of Reynolds number at different shear rate stations in friction flow loop testing, wherein Reynolds number is measured at each stabilized step; and
    computing pressure losses with the experimental data at the different shear rate stations to produce a pressure mathematical model that correlates with pressure drop hydraulics.

6. The method recited in claim 5, wherein computing the pressure losses comprises processing the experimental data in a hydraulics model to find a best curve fit combining the Reynolds number and the shear rate for each of the stations in the elastic region of the behavior of the elastic fluid defined by the storage modulus (G') being greater than the loss modulus (G").

7. The method of claim 6, wherein modeling the hydraulic fracturing with the elastic fluid in the completion interval based on the formation parameters, the completion parameters, and the fluid parameters comprises modeling flow restrictions in the completion interval and calculating the pressure losses of the elastic fluid pumped at a pump rate through the modeled flow restrictions.

8. The method of claim 1, wherein obtaining the fluid parameters of the elastic fluid further comprises:
  obtaining experimental data of a suspension capacity of the elastic fluid;
  using the experimental data in a 3D Model suspension test run up to a maximum concentration by combining the experimental data with elasticity and viscosity parameters of the elastic fluid, and calibrating a proppant transport model for the elastic fluid with numerical simulations for particle settling based on coupled Computational Fluid Dynamics (CFD) and Discrete Element Methods (DEMs); and
  quantifying a proppant-carrying capacity of the elastic fluid based on the proppant transport model for the elastic fluid.

9. The method of claim 8, further comprising quantifying the proppant-carrying capacity of the elastic fluid with respect to density by performing numeric analysis.

10. The method of claim 8, further comprising quantify the proppant-carrying capacity of the elastic fluid with respect to various proppant types and concentrations by performing numeric analysis.

11. The method of claim 1, wherein modeling the hydraulic fracturing with the elastic fluid in the completion interval in the formation based on the formation parameters, the completion parameters, and the fluid parameters comprises optimizing the fracturing parameters based on a selection of the elastic fluid, a proppant type, a proppant concentration, and a pumping rate according to a stimulation objective.

12. The method of claim 1, wherein modeling the hydraulic fracturing with the elastic fluid in the completion interval based on the formation parameters, the completion parameters, and the fluid parameters comprises modelling based on one or more of: reservoir depth, pore pressure gradient, porosity, permeability, total organic carbon (TOC), water saturation, Young's modulus, Poisson's ratio, rock strength, cohesion, and sh-min gradient.

13. The method of claim 1, wherein modeling the hydraulic fracturing comprises one or more of:
  performing a simulation to predict hydraulic fracture propagation, fracture height growth, and natural fracture reactivation;
  performing a simulation to model proppant transport within both main hydraulic fractures and a reactivated natural fracture network;
  performing a simulation to assess proppant embedment and crush-fracture surface closure behavior during production; and
  performing a simulation to forecast production efficiency.

14. The method recited in claim 1, wherein determining the fracturing parameters comprises determining a modified pumping schedule.

15. The method of claim 14, wherein determining the modified pumping schedule comprises changing an injection time, a rate, a proppant type, a viscosity of the elastic fluid at different shear rates, and a density of the elastic fluid.

16. The method of claim 1, wherein performing the operation of the hydraulic fracturing with the elastic fluid in the completion interval using the determined fracturing parameters comprises pumping the elastic fluid at least in the completion interval according one or more of a pressure, stimulation time, a fluid density, a fluid viscosity, a proppant density, and a proppant diameter from the determined fracturing parameters.

17. The method of claim 1, further comprising:
  obtaining field data of the elastic fluid by assessing the performance of the hydraulic fracturing; and
  updating the fluid parameters of the elastic fluid based on the obtained field data.

18. The method of claim 17, wherein obtaining the field data comprises collecting friction data at different rates and flow path restrictions; and wherein updating the fluid parameters comprises improving the determination of the friction performance of the elastic fluid with the collected friction data at the different flow rates and the flow path restrictions.

19. A programmable storage device having program instructions stored thereon for causing a programmable control device to perform a method to hydraulically fracture a completion interval in a formation according to claim 1.

20. A method implemented with a fracturing system to hydraulically fracture a completion interval in a formation, the method comprising:
  obtaining completion parameters characterizing the completion interval;
  obtaining formation parameters characterizing the formation;
  obtaining fluid parameters characterizing an elastic fluid for the hydraulic fracturing by:
    (i) defining regions of behavior for the elastic fluid relating shear rate relative to viscosity of the elastic fluid, the regions of behavior including a viscous region defined by the Power Law and including an elastic region defined by storage modulus (G') relative to loss modulus (G"), and
    (ii) defining, according to the regions of behavior, friction performance of the elastic fluid relating fiction gradient relative to flow rate of the elastic fluid by:
      (a) obtaining experimental data points in terms of Reynolds number at different shear rates in friction flow loop testing, wherein Reynolds number is measured at each stabilized step; and
      (b) computing pressure losses with the experimental data at the different shear rates to produce a pressure mathematical model that correlates with pressure drop hydraulics;
  determining fracturing parameters for the hydraulic fracturing by modeling the hydraulic fracturing with the elastic fluid in the completion interval in the formation based on the formation parameters, the completion parameters, and the fluid parameters; and
  performing an operation of the hydraulic fracturing with the elastic fluid in the completion interval using the determined fracturing parameters.

21. The method of claim 20, wherein computing the pressure losses comprises processing the experimental data in a hydraulics model to find a best curve fit combining the Reynolds number and the shear rates in the elastic region of the behavior of the elastic fluid defined by the storage modulus (G') being greater than the loss modulus (G").

22. The method of claim 20, wherein modeling the hydraulic fracturing with the elastic fluid in the completion interval based on the formation parameters, the completion parameters, and the fluid parameters comprises modeling flow restrictions in the completion interval and calculating the pressure losses of the elastic fluid pumped at a pump rate through the modeled flow restrictions.

23. A method implemented with a fracturing system to hydraulically fracture a completion interval in a formation, the method comprising:
- obtaining completion parameters characterizing the completion interval;
- obtaining formation parameters characterizing the formation;
- obtaining fluid parameters characterizing an elastic fluid for the hydraulic fracturing by:
  (i) defining regions of behavior for the elastic fluid relating shear rate relative to viscosity of the elastic fluid, the regions of behavior including a viscous region defined by the Power Law and including an elastic region defined by storage modulus (G') relative to loss modulus (G"),
  (ii) defining, according to the regions of behavior, friction performance of the elastic fluid relating fiction gradient relative to flow rate of the elastic fluid;
  (iii) obtaining experimental data of a suspension capacity of the elastic fluid;
  (iv) calibrating a proppant transport model for the elastic fluid using the experimental data combined with elasticity and viscosity parameters of the elastic fluid; and
  (v) quantifying a proppant-carrying capacity of the elastic fluid based on the proppant transport model for the elastic fluid;
- determining fracturing parameters for the hydraulic fracturing by modeling the hydraulic fracturing with the elastic fluid in the completion interval in the formation based on the formation parameters, the completion parameters, and the fluid parameters; and
- performing an operation of the hydraulic fracturing with the elastic fluid in the completion interval using the determined fracturing parameters.

24. The method of claim 23, wherein calibrating the proppant transport model for the elastic fluid using the experimental data combined with the elasticity and viscosity parameters of the elastic fluid comprises using the experimental data in a 3D Model suspension test run up to a maximum concentration by combining the experimental data with elasticity and viscosity parameters of the elastic fluid, and calibrating the proppant transport model for the elastic fluid with numerical simulations for particle settling based on coupled Computational Fluid Dynamics (CFD) and Discrete Element Methods (DEMs).

25. The method of claim 23, further comprising quantifying the proppant-carrying capacity of the elastic fluid with respect to density by performing numeric analysis.

26. The method of claim 23, further comprising quantify the proppant-carrying capacity of the elastic fluid with respect to various proppant types and concentrations by performing numeric analysis.

27. A method implemented with a fracturing system to hydraulically fracture a completion interval in a formation, the method comprising:
- obtaining completion parameters characterizing the completion interval;
- obtaining formation parameters characterizing the formation;
- obtaining fluid parameters characterizing an elastic fluid for the hydraulic fracturing by:
  (i) defining regions of behavior for the elastic fluid relating shear rate relative to viscosity of the elastic fluid, the regions of behavior including a viscous region defined by the Power Law and including an elastic region defined by storage modulus (G') relative to loss modulus (G"), and
  (ii) defining, according to the regions of behavior, friction performance of the elastic fluid relating fiction gradient relative to flow rate of the elastic fluid by:
    (a) obtaining experimental data points in terms of Reynolds number at different shear rates; and
    (b) computing pressure losses with the experimental data at the different shear rates by processing the experimental data in a hydraulics model to find a best curve fit combining the Reynolds number and the shear rates in the elastic region of the behavior of the elastic fluid defined by the storage modulus (G') being greater than the loss modulus (G");
- determining fracturing parameters for the hydraulic fracturing by modeling the hydraulic fracturing with the elastic fluid in the completion interval in the formation based on the formation parameters, the completion parameters, and the fluid parameters; and
- performing an operation of the hydraulic fracturing with the elastic fluid in the completion interval using the determined fracturing parameters.

28. The method of claim 27, wherein modeling the hydraulic fracturing with the elastic fluid in the completion interval based on the formation parameters, the completion parameters, and the fluid parameters comprises modeling flow restrictions in the completion interval and calculating the pressure losses of the elastic fluid pumped at a pump rate through the modeled flow restrictions.

* * * * *